(12) United States Patent
Sahin et al.

(10) Patent No.: US 9,319,197 B2
(45) Date of Patent: Apr. 19, 2016

(54) METHOD AND APPARATUS FOR INTERFERENCE MITIGATION VIA SUCCESSIVE CANCELLATION IN HETEROGENEOUS NETWORKS

(75) Inventors: Onur Sahin, Brooklyn, NY (US); Jialing Li, Melville, NY (US); Yingxue Li, San Diego, CA (US); Philip Pietraski, Huntington Station, NY (US)

(73) Assignee: INTERDIGITAL PATENT HOLDINGS, INC., Wilmington, DE (US)

( * ) Notice: Subject to any disclaimer, the term of this patent is extended or adjusted under 35 U.S.C. 154(b) by 112 days.

(21) Appl. No.: 13/884,586

(22) PCT Filed: Nov. 10, 2011

(86) PCT No.: PCT/US2011/060258
§ 371 (c)(1),
(2), (4) Date: Jan. 9, 2014

(87) PCT Pub. No.: WO2012/064998
PCT Pub. Date: May 18, 2012

(65) Prior Publication Data
US 2014/0146756 A1    May 29, 2014

Related U.S. Application Data

(60) Provisional application No. 61/412,286, filed on Nov. 10, 2010, provisional application No. 61/490,591, filed on May 26, 2011.

(51) Int. Cl.
*H04L 5/00* (2006.01)
*H04L 1/00* (2006.01)
(Continued)

(52) U.S. Cl.
CPC ............ *H04L 5/0055* (2013.01); *H04L 1/0025* (2013.01); *H04L 1/1607* (2013.01); *H04L 1/18* (2013.01); *H04L 2001/0097* (2013.01)

(58) Field of Classification Search
None
See application file for complete search history.

(56) References Cited

U.S. PATENT DOCUMENTS

| 6,839,336 B2 | 1/2005 | Tiedemann et al. |
| 2003/0202491 A1* | 10/2003 | Tiedemann et al. .......... 370/335 |

(Continued)

FOREIGN PATENT DOCUMENTS

| CN | 101330452 | 12/2008 |
| EP | 2012458 | 1/2009 |

(Continued)

OTHER PUBLICATIONS

"3rd Generation Partnership Project; Technical Specification Group Radio Access Network; Evolved Universal Terrestrial Radio Access (E-UTRA); Further Advancements for E-UTRA Physical Layer Aspects", 3GPP TR 36.814 V9.0.0, Mar. 2010, 104 Pages.

(Continued)

*Primary Examiner* — Faruk Hamza
*Assistant Examiner* — Alan Lindenbaum
(74) *Attorney, Agent, or Firm* — Theodore Naccarella

(57) ABSTRACT

Techniques for inter-cell interference cancellation are disclosed. At each transmitter, the data (message) may split into two or more layers, (e.g., common and private parts), and may be encoded in different rates, allocated with different powers, possibly beamformed using different precoders, and transmitted through the same physical channels. The common part is to be decoded at both the intended and unintended users, while the private part is to be decoded at the intended user.

19 Claims, 9 Drawing Sheets

(51) Int. Cl.
*H04L 1/16* (2006.01)
*H04L 1/18* (2006.01)

(56) References Cited

U.S. PATENT DOCUMENTS

| | | | |
|---|---|---|---|
| 2006/0251175 A1* | 11/2006 | Reznik et al. ............ | 375/240.24 |
| 2008/0188190 A1 | 8/2008 | Prasad | |
| 2008/0273624 A1 | 11/2008 | Kent | |
| 2008/0279145 A1 | 11/2008 | Boariu et al. | |
| 2009/0161572 A1 | 6/2009 | Lagrange et al. | |
| 2009/0252243 A1 | 10/2009 | Yu et al. | |
| 2010/0232535 A1 | 9/2010 | Yue | |
| 2011/0009140 A1 | 1/2011 | Hwang | |
| 2011/0070918 A1* | 3/2011 | Hafeez .......................... | 455/522 |
| 2011/0075753 A1* | 3/2011 | Jung et al. ...................... | 375/267 |
| 2011/0085610 A1* | 4/2011 | Zhuang et al. ................. | 375/260 |
| 2011/0194523 A1* | 8/2011 | Chung et al. .................. | 370/329 |
| 2011/0255584 A1 | 10/2011 | Dateki | |

FOREIGN PATENT DOCUMENTS

| | | |
|---|---|---|
| EP | 2410685 | 1/2012 |
| JP | 2005-524339 | 8/2005 |
| JP | 2009-515372 | 4/2009 |
| JP | 2009-100116 | 5/2009 |
| JP | 2010-219817 | 9/2010 |
| WO | WO-2007/014021 | 2/2007 |
| WO | WO-2010/082319 | 7/2010 |

OTHER PUBLICATIONS

"3rd Generation Partnership Project, Technical Specification Group Services and System Aspects, Network composition feasibility study (Release 9)", 3GPP TR 22.980 V9.0.0, Dec. 2009, 49 pages.
"International Search Report and Written Opinion", Application No. PCT/US2011/060258, Jun. 13, 2012, 21 pages.
Carleial, Aydano B., "A Case Where Interference Does Not Reduce Capacity", IEEE Transactions on Information Theory, vol. IT-21, No. 5, pp. 569-570, Sep. 1975, 2 Pages.
Carleial, Aydano B., "Interference Channels", IEEE Transactions on Information Theory, vol. IT-24, No. 1, pp. 60-70, Jan. 1978, 11 pages.
Dahrouj, Hayssam, et al., "Interference Mitigation with Joint Beamforming and Common Message Decoding in Multicell Systems", Proc. IEEE Inter. Symposium on Inform. Theory (ISIT), Austin, Texas, USA, pp. 2068-2072, Jan. 2010, 5 pages.
Dhillon, Harpreet Singh, "Optimal Sum-Rate of Multi-Band MIMO Interference Channel", Master of Science in Electrical Engineering Thesis, Virginia Polytechnic Institute and State University, Jul. 23, 2010, 244 pages.
Etkin, Raul H., et al., "Gaussian Interference Channel Capacity to Within One Bit: the General Case", IEEE, ISIT2007, Nice, France, pp. 2181-2185, Jun. 24-29, 2007, 5 pages.
Han, Te Sun, et al., "A New Achievable Rate Region for the Interference Channel", IEEE Transactions on Information Technology, vol. IT-27, No. 1, pp. 49-60, Jan. 1981, 12 pages.
Heath, Robert, et al., "Precoding and Interpolation for Spatial Multiplexing MIMO-OFDM with Limited Feedback", Wireless Networking and Communications Group (WNCG), Jul. 30, 2004, 23 pages.
Karmakar, Sanjay, et al., "Capacity of the MIMO Interference Channel to Within a Constant Gap", Draft, submitted to Trans. Inform. Th., Feb. 1, 2011, 38 pages.
Kramer, Gerhard, "Outer Bounds on the Capacity of Gaussian Interference Channels", IEEE Transactions on Information Theory, vol. 50, No. 3, pp. 581-586, Mar. 2004, 6 pages.
LG Electronics, "Multi-layered Rate Control for SIC-based CoMP", 3GPP Tdoc R1-091101, 3GPP TSG RAN WG1 Meeting #56bis, Seoul, Korea, Mar. 23-27, 2009, 10 pages.
LG Electronics, "Multi-layered Rate Control for Uplink CoMP", 3GPP Tdoc R1-094179, 3GPP TSG RAN WG1 Meeting #58bis, Miyazaki, Japan, Oct. 12-16, 2009, 9 pages.
Li, Jialing, et al., "Performance Benchmark for Network MIMO Systems: A Unified Approach for MMSE Transceiver Design and Performance Analysis", 2010 IEEE, Global Telecommunications Conference (GLOBECOM 2010), pp. 1-6, Dec. 2010, 6 pages.
Mayer, Timo, et al., "Turbo Base-Station Cooperation for Joint Detection and Decoding", The Pennsylvania State University CiteSeerX Archives, 5 pages.
Panasonic, "Possibility of UE side ICI cancellation in Hetnet", 3GPP Tdoc R1-102885, 3GPP TSG RAN WG1 Meeting #61, Montreal, Canada, May 10-14, 2010, 2 pages.
Pischella, Mylene, et al., "Graph-based weighted sum throughput maximization in OFDMA cellular networks", IEEE, Proc. of IWCLD '09, Second International Workshop on Cross Layer Design, pp. 1-6, Jun. 11-12, 2009, 6 pages.
Qualcomm Europe, "Preliminary CoMP gains for ITU micro scenario", 3GPP Tdoc R1-092051, 3GPP TSG-RAN WG1 #57, San Francisco, USA, May 4-8, 2009, 6 pages.
Sadek, Mirette, et al., "A Leakage-Based Precoding Scheme for Downlink Multi-User MIMO Channels", IEEE Transactions on Wireless Communications, vol. 6, No. 5, pp. 1711-1721, May 2007, 11 pages.
Sandell, Magnus, et al., "Per-Tone Transmit Antenna Selection with Phase Precoding for OFDM", IEEE Transactions on Communications, vol. 59, No. 6, pp. 1514-1518, Jun. 2011, 5 pages.
Shang, Xiaohu, et al., "Capacity Regions and Sum-Rate Capacities of Vector Gaussian Interference Channels", IEEE Transactions on Information Theory, vol. 56, No. 10, pp. 5030-5044, Oct. 2010, 15 pages.
Shang, Xiaohu, et al., "On the Achievable Sum Rate for MIMO Interference Channels", IEEE Transactions on Information Theory, vol. 52, No. 9, pp. 4313-4320, Sep. 2006, 8 pages.
Tulino, Antonia M., et al., "MIMO Capacity with Channel State Information at the Transmitter", 2004 IEEE Eighth International Symposium on Spread Spectrum Techniques and Applications, ISSSTA2004, Sydney, Australia, Aug. 30-Sep. 2, 2004, 5 pages.
Xia, Ziang-Gen, "New Precoding for Intersymbol Interference Cancellation Using Nonmaximally Decimated Multirate Filterbanks with Ideal FIR Equalizers", IEEE Transactions on Signal Processing, vol. 45, No. 10, pp. 2431-2441, Oct. 1997, 11 pages.
Xu, Jing, et al., "Coordinated Multi-Cell Space Frequency Block Coding Based on Inter-Cell Large Cyclic Delay", IEEE Communications Letters, vol. 14, No. 10, pp. 921-923, Oct. 2010, 3 pages.
"Official Notice of Rejection", Japanese Patent Application No. 2013-538908, Sep. 8, 2015, 3 pages.
"Official Notice of Rejection (English Translation)", Japanese Patent Application No. 2013-538908, Sep. 8, 2015, 3 pages.
"Patent Abstract of JP 2009-100116", May 7, 2009, 1 page.
"Chinese Office Action", Chinese Application No. 201180064496.3, Apr. 21, 2015, 7 pages.
"Chinese Office Action (English Translation)", Chinese Application No. 201180064496.3, Apr. 21, 2015, 13 pages.
" CN-101330452", CN-101330452 English Abstract, Dec. 24, 2008, 1 page.

* cited by examiner

A COOPERATING SET OF A HETEROGENEOUS NETWORK SYSTEM

METHOD AND APPARATUS FOR INTERFERENCE MITIGATION VIA SUCCESSIVE CANCELLATION IN HETEROGENEOUS NETWORKS

CROSS REFERENCE TO RELATED APPLICATIONS

This application is a National Stage Application filed under 35 U.S.C. 371 of International Application No. PCT/US11/60258, which was filed on Nov. 10, 2011 and which claims the benefit of U.S. Provisional Patent Application Ser. No. 61/412,286, filed Nov. 10, 2010 and Ser. No. 61/490,591, filed May 26, 2011, each of which is incorporated by reference as if fully set forth herein.

BACKGROUND

The steady march of Moore's law has brought an ever-increasing level of processing power to not only desktop and laptop computers, but also mobile devices. Like desktop and laptop computers, many of the mobile devices are capable of processing information at rates equaling or exceeding broadband. Having become accustomed to broadband performance in connection with their (e.g., desktop and/or laptop) computers, users of the mobile devices ("mobiles") have come to expect from cellular networks to provide at least the performance to match the capabilities of the mobiles, and for the most part, network capacity has grown commensurately. The resultant explosive growth in network capacity has been consistent with Cooper's Law. That is, network capacity (e.g., total data delivery per month) has doubled each month since the days of Marconi, and such growth is predicted to continue for at least the foreseeable future.

A breakdown of Cooper's law reveals that a vast majority of the network capacity results from increases in density of large-scale cellular ("macro") networks, specifically, as a result of adding more macro cells to the macro networks (and thereby maintaining homogeneity of the macro network). Experts and commentators, however, are currently questioning whether further increasing network capacity of the macro networks in this way is practicable, practical and/or judicious.

Instead of adding more macro cells, operators of a macro network may address increases in data demand (i.e., increase network capacity) by supplementing existing grids of macro cells with small-scale cells, such as microcells, picocells and femtocells, particularly in hotspot regions. Supplementing the macro network with the small-scale cells (hereinafter "femtocells", for convenience) results in a mixture of macro cells and femtocells; such mixture is commonly referred to as a heterogeneous network ("HetNet"). The HetNet can, in principle, provide cost effective data delivery capable of meeting the performance demanded by users.

Unfortunately, to realize such performance (by maximizing throughput among the macro cells and femtocells) interference in the HetNet among the macro cells and femtocells is likely to occur. This interference ("inter-cell interference"), due to in part, the femtocells overlaying the macro cells, can be substantially more severe than among macro cells of a homogeneous macro network.

In the HetNet, it is potentially beneficial to push users into the femtocells because, in general, fewer users utilize the femtocells, and in turn, compete for resources. This potentially imposes a large Signal to Interference-plus-Noise Ratio ("SINR") penalty on some such users. For example, any of the femtocells may limit access to users who are members of a Closed Subscriber Group ("CSG"). Each of such femtocells ("closed access femtocells") has a potential to create significant ICI for a user associated with one of the macro cells ("macro cell user"), when, for example, the macro cell user wanders into a coverage area of one of the closed-access femtocell, but is not a member of the CSG. The ICI arises because the macro cell user cannot connect to the closed access femtocell, which could otherwise provide it a large SINR signal. Instead the macro cell user is forced to use signals emanating from a transmitter of the macro cell (e.g., via a macro network layer), which could have a very low SINR. A similar phenomenon happens for any of the femtocells providing open access, where the macro cell user is associated to a Femto cell due to range expansion, for instance, and hence observes significant interference from the transmitter of the macro cell (e.g., via a macro-network layer).

Various techniques for handing the inter-cell interference ("ICI") in various types of multi-cell wireless communication networks. For example, when transmitters can share data via backhaul, joint transmission/joint processing ("JT/JP") techniques in both uplink and downlink has been proposed, for example, in long-term evolution ("LTE"). With the JT/JP in the downlink, data is shared, processed and jointly transmitted via coordinated base stations so that interfering links are used as desired links. With JT/JP in the uplink, received data is shared and jointly processed. It has been shown that JT/JP provides significant gains in multi-cell downlink systems, especially to users operating at edges of cells ("cell-edge users"). However, the overhead and cost required to share data between inter-cell base stations may not be affordable in a lot of practical systems.

Standards, such as LTE, focus on other techniques for handing ICI, which, unlike JT/JP, do not require sharing of data between inter-cell base stations ("inter-cell data sharing"). Among such techniques, in the medium and weak interference regime, which is typically observed in homogeneous networks, is coordinated beam forming ("CBF"). CBF treats the ICI as a noise. It has been shown that CBF provides gains to average cell performance and significant gains to cell-edge users in homogeneous networks, which typically see medium ICI.

However, when a strong ICI is present, CBF is strictly sub-optimal. It has been shown in the single-input single-output ("SISO") scenario and in the multiple-input multiple-output ("MIMO") scenario that a strong interference may not be harmful. In the SISO scenario and in the MIMO scenario, superposition coding has been suggested for dealing with the strong ICI in two cell, single user ("SU") systems, and shown significant gains.

SUMMARY

Embodiments for inter-cell interference cancellation are disclosed. At each transmitter, the data (message) may split into two or more layers, (e.g., common and private parts), and may be encoded in different rates, allocated with different powers, possibly beamformed using different precoders, and transmitted through the same physical channels. The common part is to be decoded at both the intended and unintended users, while the private part is to be decoded at the intended user.

In some embodiments, the methods may include: obtaining at a WTRU, demodulation information associated with a private part, a first common part and a second common part; processing a received signal, according to the demodulation information, including at least the first common part, the second common part, and the private part; and, transmitting a multipart HARQ message indicating a combination of acknowledgements and/or non-acknowledgements (ACK/NACK) for the first common part, second common part, and private part.

In additional embodiments, the demodulation information includes Modulation and Coding Scheme (MCS) information; or the MCS information for the first common part is obtained from a Physical Downlink Control Channel (PDCCH) of a first eNodeB and the MCS for the second common part is obtained from a PDCCH of a second eNodeB; or still further, the MCS information is obtained from demodulation reference symbols (DM-RS).

In additional embodiments, the demodulation information includes precoder information and/or power allocations. Still further additional embodiments may further comprise transmitting a Successive Interference Cancellation (SIC) indicator message; or may further comprise processing a signal retransmitted in response to the multipart HARQ message, using successive interference cancellation.

In additional embodiments, a method comprises: obtaining at a first eNodeB a plurality of transmit spatial covariance matrices associated with a respective plurality of WTRUs, including receiving covariance information associated with at least one transmit spatial covariance matrix via an X2 interface from a second eNodeB; determining common and private message splitting rates based on the plurality of covariance matrices; determining common and private precoder weights based on the transmit spatial covariance matrices; and, transmitting a common and a private message parts using the common and private message splitting rates, respectively, and the common and private precoder weights, respectively. In additional embodiments, the covariance information associated with at least one transmit spatial covariance matrix is used to generate an estimate of a corresponding transmit spatial covariance matrix; or the estimate is based on one or more of RI, PMI, and CQI.

Further embodiments include an apparatus comprising: a WTRU including a processor, configured to: obtain demodulation information associated with a private part, a first common part and a second common part; process a received signal, according to the demodulation information, including at least the first common part, the second common part, and the private part; and, control a HARQ process and generate a multipart HARQ message indicating a combination of acknowledgements and/or non-acknowledgements (ACK/NACK) for the first common part, second common part, and private part; and, a transceiver configured to transmit the multipart HARQ message. In some embodiments, the WTRU is configured to obtain the MCS information for the first common part from a Physical Downlink Control Channel (PDCCH) of a first eNodeB and to obtain the MCS for the second common part from a PDCCH of a second eNodeB. The WTRU may also be configured to obtain the MCS information from demodulation reference symbols (DM-RS).

In additional embodiments, the demodulation information includes one of precoder information or power allocations, and/or may be configured to transmit a Successive Interference Cancellation (SIC) indicator message.

BRIEF DESCRIPTION OF THE DRAWINGS

A more detailed understanding may be had from the Detailed Description below, given by way of example in conjunction with drawings appended hereto. Figures in such drawings, like the detailed description, are examples. As such, the Figures and the detailed description are not to be considered limiting, and other equally effective examples are possible and likely. Furthermore, like reference numerals in the Figures indicate like elements, and wherein.

DETAILED DESCRIPTION

Overview

Figure 1A:
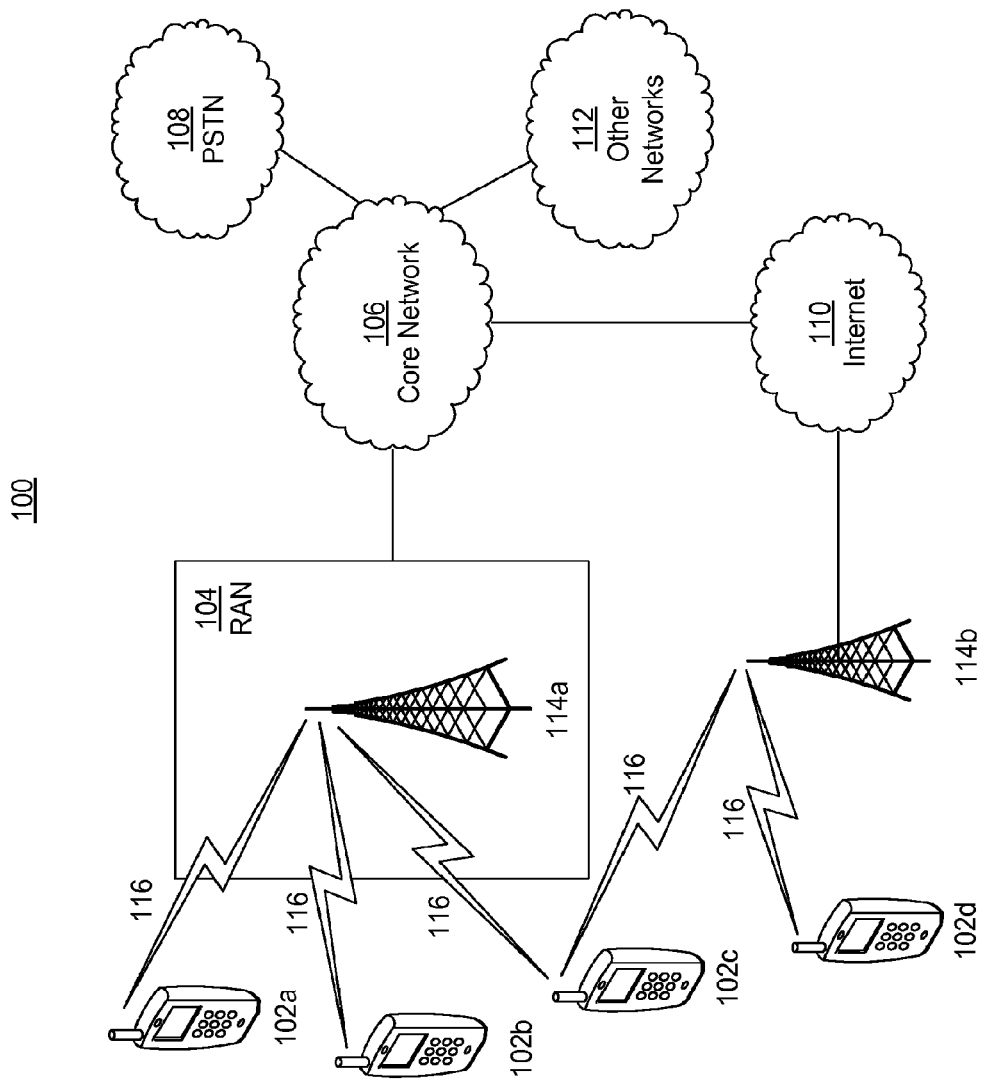
FIG. 1A is a block diagram illustrating an example of a communications system in which one or more disclosed embodiments may be implemented.

A system and method for mitigating inter-cell interference ("ICI") in a multi-cell network, such as a heterogeneous network ("HetNet") is disclosed. The HetNet may include multiple macro cells and multiple femtocells overlaying the multiple macro cells, such as shown for example in FIG. 1A. Each of multiple macro cells and femtocells include one or more transmitters and one more receivers, and the transmissions in different cells of the HetNet use overlapped time and frequency resources (i.e., concurrent transmissions with a non-zero frequency reuse factor). Therefore, the receivers experience ICI from the transmitters of other (macro and/or femto) cells, which transmit using the same time and frequency resource.

The system and method may mitigate the ICI, at a physical layer of the HetNet, in particular, using interference management ("IM") based on Superposition Coding (SPC) to successively cancel from received signals one or more interfering signals. SPC is a technique that enables transmitting multiple messages simultaneously. The methods described herein are not limited to SPC. An alternative way of transmitting messages simultaneously, for example, is hierarchical modulation. Other techniques may also be used.

In one embodiment, the IM may be carried out as follows. A transmitter of a first cell (e.g., a femtocell) may obtain a message for delivery to a given user ("intended user") associated with the first cell. Thereafter, the transmitter may split the message into multiple parts, and in turn, transmit the multiple parts. The transmitter may transmit some of the multiple parts at a rate at which only the intended user is capable of decoding such parts. For simplicity, the parts transmitted at such rate are referred to herein as the "private part" (of the message), and the corresponding rate is referred to herein as the "private rate." The transmitter may transmit the remaining parts of the multiple parts at a rate at which the intended user along with one or more unintended users are capable of decoding the remaining parts. For simplicity, the remaining parts are referred to herein as the "common part" (of the message), and the corresponding rate is referred to herein as the "common rate."

As a result of the transmitter transmitting the common part, any of the unintended users that are adapted to decode the common part may subtract or cancel this interference from a signal received by such unintended user via an advanced receiver. Examples of such advanced receiver may include a minimum mean squared error receiver with successive interference cancellation ("MMSE-SIC") or maximum likelihood ("ML") receiver. By subtracting or cancelling the interference, the unintended receiver experiences a higher effective SINR for its desired signals. Furthermore, the common part may undergo precoding using a first precoder ("common precoder") to cause the transmitter to transmit the common part on a first spatial layer. The private part may also undergo precoding using a second precoder to cause the transmitter to transmit the common part of a second spatial layer (i.e., a spatial layer different from the first spatial layer). In alternative embodiments, each spatial layer may also be composed of both common and private layers (via, e.g., SPC). Furthermore, each part, common or private, may be transmitted as a number of spatial layers. The spatial layers of the common part and those of the private parts are multiplexed into the same transmit antennas. They may not be spatially independent in general. In the rank-1 case when the common precoder is orthogonal to the private precoder (as in the common precoder design approach 2 below), they are independent spatial layers.

In another embodiment, a first (e.g., macro-cell) transmitter obtains a first message for transmission to a first receiver associated with the first cell. The first transmitter splits the first message into a first common part and a first private part. The first transmitter then precodes the first common part using a first common rate, and precodes the first private part using the first private rate.

A second transceiver (i.e., the femtocell transmitter paired with the first transmitter) obtains a second message for transmission to a second receiver associated with the second cell. The second transmitter splits the second message into third and fourth parts. The second transmitter then precodes the third part at a second common rate, and precodes the fourth part at a second private rate.

The first transmitter may transmit the first common and private parts, via a first plurality of antennas communicatively coupled to the first transmitter, to facilitate reception of the first common and private parts by the first and second receivers. The second transmitter may transmit the second common and private parts, via a second plurality of antennas communicatively coupled to the second transmitter, to facilitate reception of the second common and private parts by the first and second receivers.

The IM follows a network-wise optimization methodology. In this regard, the macro-cells and overlaid femtocells are paired, and are jointly entitled to participate in superposition (i.e., message splitting) to facilitate canceling each other's common codewords, whereas several such Macro-Femto cell pairs form a cooperating set (hereinafter referred to as a "CoMP set") at the same time, and jointly try to minimize interference to one another—and do so independently from the Macro-Femto pairs in other CoMP sets.

Example System Architecture

FIGS. 1A-1D are block diagrams illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access ("CDMA"), time division multiple access ("TDMA"), frequency division multiple access ("FDMA"), orthogonal FDMA ("OFDMA"), single-carrier FDMA ("SC-FDMA"), and the like.

As shown in FIG. 1A, the communications system 100 may include wireless transmit/receive units ("WTRUs") 102a, 102b, 102c, 102d, a radio access network ("RAN") 104, a core network 106, a public switched telephone network ("PSTN") 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment ("UE"), a mobile station, a fixed or mobile subscriber unit, a pager, a cellular telephone, a personal digital assistant ("PDA"), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station ("BTS"), a Node-B, an eNode B, a Home Node B, a Home, eNode B, a site controller, an access point ("AP"), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller ("BSC"), a radio network controller ("RNC"), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output ("MIMO") technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency ("RF"), microwave, infrared ("IR"), ultraviolet ("UV"), visible light, etc."). The air interface 116 may be established using any suitable radio access technology ("RAT").

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System ("UMTS") Terrestrial Radio Access ("UTRA"), which may establish the air interface 116 using wideband CDMA ("WCDMA"). WCDMA may include communication protocols such as High-Speed Packet Access ("HSPA") and/or Evolved HSPA ("HSPA+"). HSPA may include High-Speed Downlink Packet Access ("HSDPA") and/or High-Speed Uplink Packet Access ("HSUPA").

In another embodiment, the base station 114a and the WTRUs 102a, 102b, 102c may implement a radio technology such as Evolved UMTS Terrestrial Radio Access ("E-UTRA"), which may establish the air interface 116 using Long Term Evolution ("LTE") and/or LTE-Advanced ("LTE-A").

In other embodiments, the base station 114a and the WTRUs 102a, 102b, 102c may implement radio technologies such as IEEE 802.16 (i.e., Worldwide Interoperability for Microwave Access ("WiMAX")), CDMA2000, CDMA2000 1x, CDMA2000 EV-DO, Interim Standard 2000 ("IS-2000"), Interim Standard 95 ("IS-95"), Interim Standard 856 ("IS-856"), Global System for Mobile communications ("GSM"), Enhanced Data rates for GSM Evolution ("EDGE"), GSM EDGE ("GERAN"), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network ("WLAN"). In another embodiment, the base station 114b and the WTRUs 102c, 102d may implement a radio technology such as IEEE 802.15 to establish a wireless personal area network ("WPAN"). In yet another embodiment, the base station 114b and the WTRUs 102c, 102d may utilize a cellular-based RAT (e.g., WCDMA, CDMA2000, GSM, LTE, LTE-A, etc.") to establish small-scale cell, such as a microcell, picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol ("VoIP") services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service ("POTS"). The Internet 110 may include a global system of interconnected computer networks and devices that use common communication protocols, such as the transmission control protocol ("TCP"), user datagram protocol ("UDP") and the internet protocol ("IP") in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
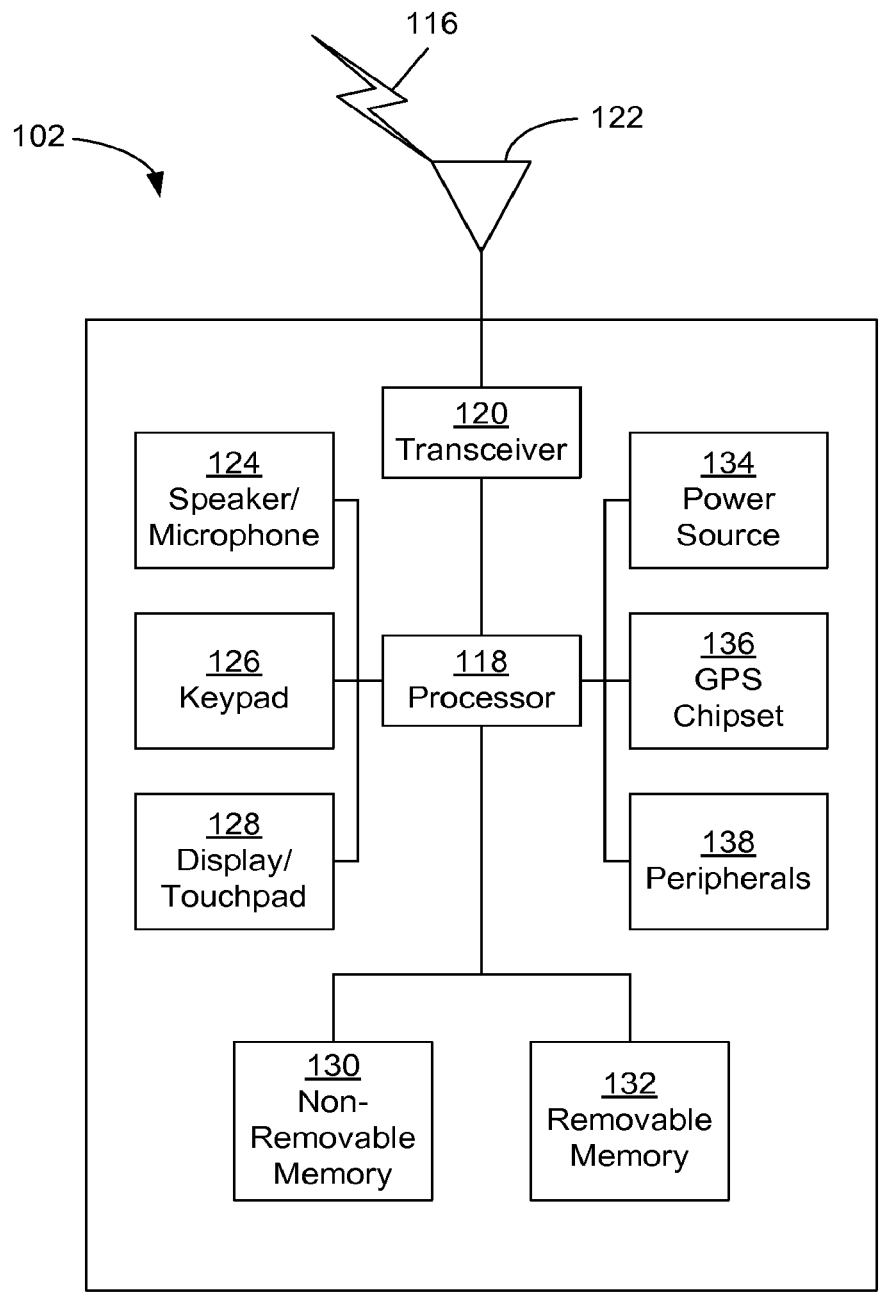
FIG. 1B is a block diagram illustrating example details of a wireless transmit/receive unit ("WTRU") of the communications system.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 106, removable memory 132, a power source 134, a global positioning system ("GPS") chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor ("DSP"), a plurality of microprocessors, one or more microprocessors in association with a DSP core, a controller, a microcontroller, Application Specific Integrated Circuits ("ASICs"), Field Programmable Gate Array ("FPGAs") circuits, any other type of integrated circuit ("IC"), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display ("LCD") display unit or organic light-emitting diode ("OLED") display unit). The processor 118 may also output user data to the speaker/microphone 124, the keypad 126, and/or the display/touchpad 128. In addition, the processor 118 may access information from, and store data in, any type of suitable memory, such as the non-removable memory 106 and/or the removable memory 132. The non-removable memory 106 may include random-access memory ("RAM"), read-only memory ("ROM"), a hard disk, or any other type of memory storage device. The removable memory 132 may include a subscriber identity module ("SIM") card, a memory stick, a secure digital ("SD") memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium ("NiCd"), nickel-zinc ("NiZn"), nickel metal hydride ("NiMH"), lithium-ion ("Li-ion"), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus ("USB") port, a vibration device, a television transceiver, a hands free headset, a Bluetooth® module, a frequency modulated ("FM") radio unit, a digital music player, a media player, a video game player module, an Internet browser, and the like.

Figure 1C:
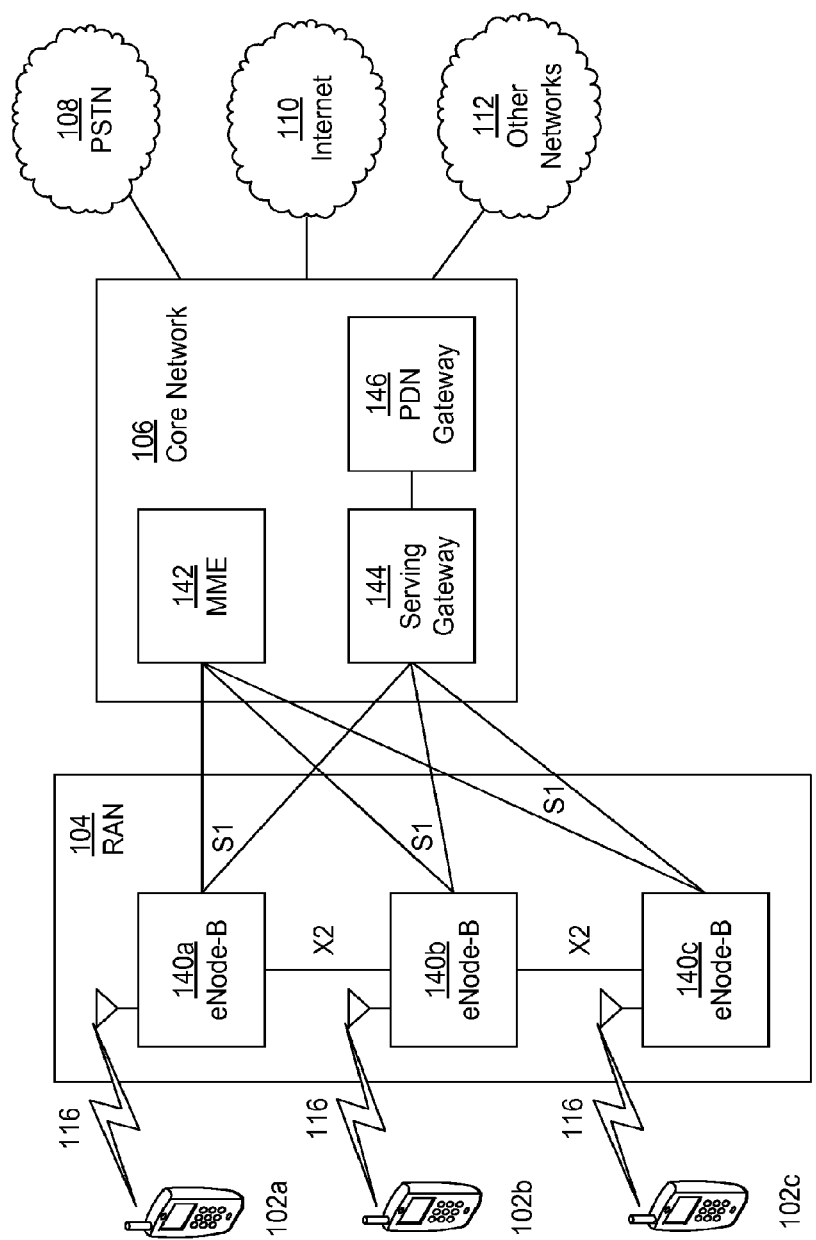
FIG. 1C is a block diagram illustrating example details of radio-access and core networks of the communications system.

FIG. 1C is a system diagram of the RAN 104 and the core network 106 according to an embodiment. As noted above, the RAN 104 may employ, an E-UTRA radio technology to communicate with the WTRUs 102a, 102b, 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, 140c may be associated with a particular cell (not shown) and may be configured to handle radio resource management decisions, handover decisions, scheduling of users in the uplink and/or downlink, and the like. As shown in FIG. 1C, the eNode-Bs 140a, 140b, 140c may communicate with one another over an X2 interface.

The core network 106 shown in FIG. 1C may include a mobility management gateway ("MME") 142, a serving gateway 144, and a packet data network ("PDN") gateway 146. While each of the foregoing elements are depicted as part of the core network 106, it will be appreciated that any one of these elements may be owned and/or operated by an entity other than the core network operator.

The MME 142 may be connected to each of the eNode-Bs 142a, 142b, 142c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode Bs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem ("IMS") server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

Figure 1D:
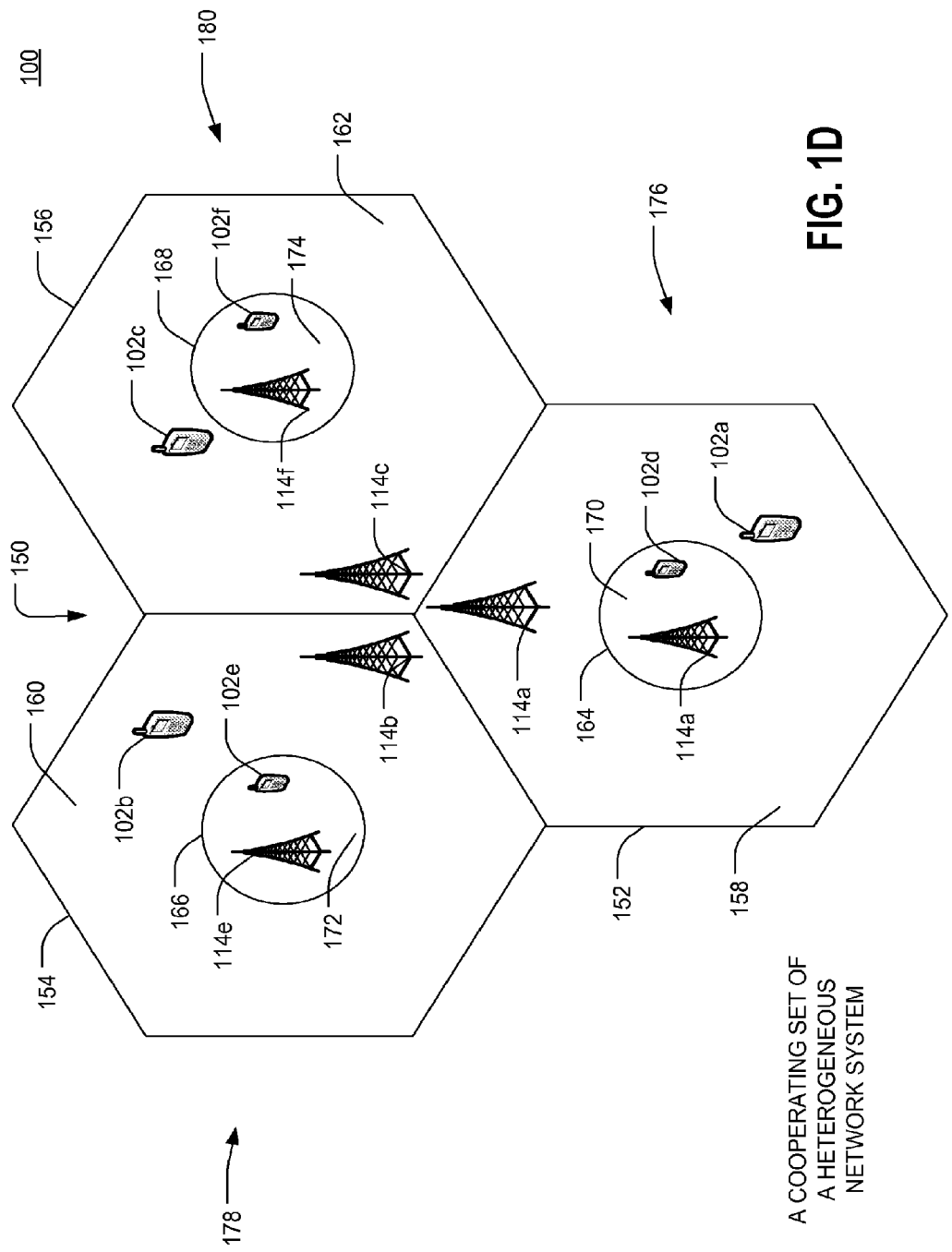
FIG. 1D is a network-topology diagram illustrating an example heterogeneous network ("HetNet") system of the communications system 100.

Referring now to FIG. 1D, a network-topology diagram illustrating an example heterogeneous network ("HetNet") system 150 of the communications system 100. The HetNet system 150, in general, may be any HetNet system that includes multiple cells, uses multiple carriers, supports (at least) downlink transmissions and supports a frequency reuse factor of 1 (or, at least, a non-zero frequency reuse factor).

The HetNet system 150 may include first, second and third large-scale ("macro") cells 152, 154 and 156, and first, second and third WTRUs 102a-c. Each of the first, second and third WTRUs 102a-c may include or be communicatively coupled to a plurality of antennas.

The first, second and third macro cells 152, 154 and 156 may include respective base stations 114a-c. These first, second and third macro-cell base stations 114a-c may include or be communicatively coupled to respective pluralities of antennas adapted to delineate corresponding coverage zones 158, 160 and 162, respectively.

The first, second and third WTRUs 102a-c may be disposed within the first, second and third coverage zones 158, 160 and 162, respectively. Being within such zones, the first, second and third WTRUs 102a-c may become associated with the first, second and third macro-cell base stations 114a-c, respectively, assuming, of course, these WTRUs ("macro-cell WTRUs") 102a-c have authorization to do so. Once associated, the first, second and third macro-cell base stations 114a-c and the first, second and third macro-cell WTRUs 102a-c may exchange communications using the same time and frequency (hereinafter "common time and frequency") resource for transmission of the communications.

The HetNet system 150 may also include first, second and third small-scale cells 164, 166 and 168, and first, second and third WTRUs 102d-f. Like the macro-cell WTRUs 102a-c, the first, second and third WTRUs 102d-f may include or be communicatively coupled to a plurality of antennas.

Each of first, second and third small-scale cells 164; 166 and 168 may be, for example, any of a microcell, picocell, femtocell and the like (collectively hereafter "femtocell"). The first, second and third femtocells 164, 166 and 168 may include respective base stations 114d-f. These femtocell base stations 114d-f may include or be communicatively coupled to respective pluralities of antennas adapted to delineate corresponding coverage zones 170, 172 and 174, respectively.

The first, second and third WTRUs 102d-f may be disposed within the first, second and third coverage zones 170, 172 and 174, respectively. Being within such zones, the first, second and third WTRUs 102d-f may become associated with the first, second and third femtocell base stations 114d-f, respectively, assuming, of course, the WTRUs ("femtocell WTRUs") 102d-f have authorization to do so. Once associated, the first, second and third femtocell base stations 114d-f and the first, second and third femtocell WTRUs 102d-f may exchange communications using the common time and frequency resource for transmission of such communications.

The first femtocell 164 may be disposed sufficiently proximate to the first macro-cell 152 so as to cause the first femtocell coverage zone 170 to overlay (some or all of) the first macro-cell coverage zone 158. Due to such overlay and to both of the first macro-cell 152 and first femtocell 164 being adapted to use the common time and frequency resource for transmissions, the first macro-cell 152 and first femtocell 164 operate as pair ("first macro-femto pair") 176 with respect to handling such transmissions.

The second femtocell 166 may be disposed sufficiently proximate to the second macro-cell 154 so as to cause the second femtocell coverage zone 172 to overlay (some or all of) the second macro-cell coverage zone 160. Due to this overlay and to both of the second macro-cell 154 and second femtocell 166 being adapted to use the common time and frequency resource for transmissions, the second macro-cell 154 and second femtocell 166 operate as pair ("second macro-femto pair") 178 with respect to handling the transmissions.

The third femtocell 168 may be disposed sufficiently proximate to the third macro-cell 156 so as to cause the third femtocell coverage zone 174 to overlay (some or all of) the third macro-cell coverage zone 162. Due to such overlay and to both of the third macro-cell 156 and third femtocell 168 being adapted to use the common time and frequency resource for transmissions, the third macro-cell 156 and third femtocell 168 operate as pair ("third macro-femto pair") 180 with respect to handling the transmissions.

As described in more detail below, the first, second and third macro-femto pairs 176, 178 and 180, together, form a CoMP set to facilitate management of interference among such first, second and third macro-femto pairs 176, 178 and 180 (i.e., inter-cell interference). And as further described in more detail below, some or all of the macro-cell and femtocell base stations 114a-f coordinate with each other in selection of WTRUs 102a-f and in determining one or more precoding schemes (to be carried out by the first, second and third macro-femto pairs 176, 178 and 180) so as to maximize throughput, e.g., a weighted sum throughput, of the CoMP set. For example, within each of first, second and third macro-femto pairs 176, 178 and 180, multi-rate coding with interference cancellation may be carried out to cancel the ICI of the macro-femto pair ("mutual ICI"), other precoding schemes may be carried out to cancel or subtract the ICI within the CoMP set.

In some instances, the femtocell WTRUs 102d-f may be associated with the first, second and third macro-cell base stations 114a-c, respectively, assuming, of course, these femtocell WTRUs 102d-f have authorization to do so. Such associations may be, in lieu of, or in addition to being associated with femtocell base stations 114d-f. In some instances, any of the femtocell base stations 114d-f may be a closed-access femtocell. In the corresponding macro-femto pairs 176-180 having closed-access femtocells, the corresponding macro-cell WTRUs 102a-c may only associate with corresponding macro-cell base station 114a. However, the femtocell WTRUs 102d-f may associate with either or both of femtocell and macro-cell base stations 114a-f of their respective macro-femto pairs 176-180.

The HetNet system 150 may be modeled as follows.

Hetnet System Model

Notations used in the following section are as follows. All boldface letters indicate vectors (lower case) or matrices (upper case). $A^T$, $A^H$, $A^{-1}$, tr(A), E(A) stand for the transpose, conjugate transpose, inverse, trace, and expectation of A, respectively. max eigenvector{A} denotes the dominant eigenvector of a Hermitian matrix A. $I_\alpha$ signifies an identity matrix with rank $\alpha$. angle ($\alpha$) denotes the angle of a complex number $\alpha$. diag{ ... } denotes a diagonal matrix with [ ... ] on the main diagonal. For two sets $S_a$, and $S_b$, $S_a \backslash S_b = \{x | x \in S_a \text{ and } x \notin S_b\}$.

Denote the set of BS indices in a CoMP set as S. So the set of BS indices out of the CoMP set is $\bar{S}$. Without loss of generality, consider one pair of Macro BS and Femto BS in the multi-rate coding with interference cancellation in S and denote them as the $i_1^{th}$ and $i_2^{th}$ BSs, respectively, where $i_1$, $i_2 \in S$, $i_1 \neq i_2$. So, the set of BS indices of the other BSs in S is $S \backslash \{i_1, i_2\}$. Denote the set of user indices associated to the $i^{th}$ as $U_i$. The Macro and Femto BSs are equipped with $t_{i_1}$ and $t_{i_2}$ transmit antennas, respectively, and the Macro and Femto users are equipped with $\tau_{i_1}$ and $\tau_{i_2}$ receive antennas, respectively. Thus, in the $l^{th}$ sub-carrier, the received signal at the $j_1^{th}$ Macro user, $j_1 \in U_{i_1}$, and that at the $j_2^{th}$ Femto user, $j_2 \in U_{i_2}$, respectively, are $$y_{j_1}^l = \sqrt{P_{i_1}^l}\, H_{j_1 i_1}^l W_{i_1}^l x_{i_1}^l + \sqrt{P_{i_2}^l}\, H_{j_1 i_2}^l W_{i_2}^l x_{i_2}^l + \tilde{n}_{j_1}^l, \; j_1 \in U_{i_1} \quad (1)$$

$$y_{j_2}^l = \sqrt{P_{i_1}^l}\, H_{j_2 i_1}^l W_{i_1}^l x_{i_1}^l + \sqrt{P_{i_2}^l}\, H_{j_2 i_2}^l W_{i_2}^l x_{i_2}^l + \tilde{n}_{j_2}^l, \; j_2 \in U_{i_2}$$

where $$\tilde{n}_{j_1}^l = \sum_{i_3 \in S\setminus\{i_1,i_2\}} \sqrt{P_{i_3}^l}\, H_{j_1 i_3}^l W_{i_3}^l x_{i_3}^l + \sum_{i \in \bar{S}} \sqrt{P_i^l}\, H_{j_1 i}^l W_i^l x_i^l + n_{j_1}^l, \quad (2)$$

$$j_1 \in U_{i_1},$$

$$\tilde{n}_{j_2}^l = \sum_{i_3 \in S\setminus\{i_1,i_2\}} \sqrt{P_{i_3}^l}\, H_{j_2 i_3}^l W_{i_3}^l x_{i_3}^l + \sum_{i \in \bar{S}} \sqrt{P_i^l}\, H_{j_2 i}^l W_i^l x_i^l + n_{j_2}^l,$$

$$j_2 \in U_{i_2}.$$

$H_{ji}^l$ is the $r_j \times t_i$ channel from $BS_i$ to the $j^{th}$ user. $P_i^l$ is the power upper bound at $BS_i$ in the $l^{th}$ sub-carrier. $x_i^l$ is the $t_i \times 1$ transmit codeword transmitted by $BS_i$, which satisfies $E(x_i^l ((x_i^l)^H) = I_{t_i}$. $W_i^l$ is the $t_i \times m_i$ normalized precoder used by $BS_i$, which satisfies the power constraint $tr[E(W_i^l (W_i^l)^H)] = 1$, where $m_i$ is the number of data stream transmitted by $BS_i$. For convenience, the precoder can be expressed as $W_i^l = [\sqrt{\alpha_{ic}^l} W_{ic}^l \sqrt{1-\alpha_{ic}^l} W_{ip}^l]$, where $W_{ic}^l$ and $W_{ip}^l$ are the normalized common and private precoders, respectively, in the $l^{th}$ sub-carrier, and satisfy the power constraints $tr[E(W_{ic}^l (W_{ic}^l)^H)] = 1$ and $tr[E(W_{ip}^l (W_{ip}^l)^H)] = 1$. Here, $\alpha_{ic}^l$ and $1-\alpha_{ic}^l$ are the power ratio allocated to the common and private parts, respectively, in the $l^{th}$ sub-carrier. $U_i$ is the set of user indices of the users associated to the $i^{th}$ BS. $\bar{n}_j^l$ is the $r_j \times 1$ out-of-pair interference (which accounts for all received interference and noise other than the interference from the BS paired with its own BS) and noise vector at the $j^{th}$ user. In (2), it should be noted that the first term represents the interference from the BSs in the CoMP set, which may be minimized through coordination in the CoMP set. On the other hand, the last two terms are the interference from the BSs out of the CoMP set, and $n_j^l$, the $r_j \times 1$ noise vector, which cannot be minimized through coordination in the CoMP set. The noise is assumed to be white Gaussian and its covariance matrix is defined as $E(n_j^l (n_j^l)^H) = \sigma^2 I_{r_j}$ for all j and for all l. Therefore, the out-of-pair interference and noise covariance matrix is given as $$\Phi_j^l = E(\tilde{n}_j^l (\tilde{n}_j^l)^H) = \sum_{i_3 \in S\setminus\{i_1,i_2\}} P_{i_3}^l H_{j i_3}^l W_{i_3}^l (H_{j i_3}^l W_{i_3}^l)^H + \quad (3)$$

$$\sum_{i \in \bar{S}} P_i^l H_{ji}^l W_i^l (H_{ji}^l W_i^l)^H + \sigma^2 I_{r_j}, \; j \in U_{i_1} \cup U_{i_2}$$

For the embodiment using multi-rate coding with interference cancellation, also defined is an in-set leakage (i.e., the leakage that causes interference to the selected users in the other cells in the CoMP set) covariance matrix of $BS_i$ in the pair as:

$$L_i^l = \sum_{i_3 \in S\setminus\{i_1,i_2\}} \sum_{j \in V_{i_3}} R_{ji}^l, \; i \in \{i_1, i_2\} \quad (4)$$

where $R_{ji}^l = (H_{ji}^l)^H H_{ji}^l$ is the transmit spatial covariance matrix of the channel from the $i^{th}$ BS to the $j^{th}$ user, for all i and j; $V_{i_3}$ is the set of the selected users indices at the $i_3^{th}$ BS, and $V_{i_3} \subseteq U_{i_3}$.

In one embodiment, the multi-rate coding design between two transmitter-receiver pairs in one sub-carrier is considered. For clarity, only two cells and one sub-carrier are analyzed, and the notation is simplified by referring to cells 1 and 2 and by dropping the superscript. That is, for notational convenience, the superscript 1 for the $l^{th}$ sub-carrier is dropped, and the pair of BSs in the design are denoted as the $1^{st}$ and $2^{nd}$ BSs, respectively, and their corresponding users are denoted as the $1^{st}$ and $2^{nd}$ users (destinations), respectively. Note that when there are multiple users associated to $BS_i$, each of them is considered in the multi-rate coding design one by one, and is always called the $i^{th}$ user in the design for notational convenience. Therefore, (1) can be rewritten as $$y_1 = \sqrt{P_1} H_{11} W_1 x_1 + \sqrt{P_2} H_{12} W_2 x_2 + \tilde{n}_1,$$

$$y_2 = \sqrt{P_1} H_{21} W_1 x_1 + \sqrt{P_2} H_{22} W_2 x_2 + \tilde{n}_2. \quad (5)$$

Here, $y_j$ is the $r_j \times 1$ received vector at the $j^{th}$ user, i,j = 1, 2. $H_{ji}$ is the $r_j \times t_i$ channel from $BS_i$ to the $j^{th}$ user. $P_i$ is the power upper bound at $BS_i$. $x_i$ is the $t_i \times 1$ transmit codeword transmitted by $BS_i$, which satisfy $E(x_i x_i^H) = I_{t_i}$, i=1, 2. $W_i = [\sqrt{\alpha_{ic}} W_{ic} \sqrt{1-\alpha_{ic}} W_{ip}]$ is the $t_i \times m_i$ normalized precoder used by $BS_i$, which satisfies the power constraint $tr(W_i W_i^H) = 1$, where $W_{ic}$ and $W_{ip}$, respectively, are the normalized common and private precoders and satisfy the power constraints $tr(W_{ic} W_{ic}^H) = 1$ and $tr(W_{ip} W_{ip}^H) = 1$, and $m_i$ is the number of data stream transmitted by $BS_i$. Here, $\alpha_{ic}$ and $1-\alpha_{ic}$ are the power ratio allocated to the common and private parts, respectively. $\tilde{n}_j^1$ is the out-of-pair interference (which accounts for all received interference and noise other than the interference from the BS paired with its own BS) and noise vector at the $j^{th}$ user, whose covariance matrix is $\Phi_j$, j=1, 2. And the in-set leakage covariance matrix of $BS_i$ is denoted as $L_i$.

MULTI-RATE CODING with Interference Cancellation
Encoding:
Each source transmits two independent splits such that $$x_1 = [x_{1c}^T x_{1p}^T]^T, \; x_2 = [x_{2c}^T x_{2p}^T]^T \quad (6)$$

where $x_{1c}$ and $x_{2c}$ are the codewords to be decoded at both users whereas $x_{1p}$ and $x_{2p}$ are desired to be decoded only at their dedicated users ("destinations"), D1 ("the $1^{st}$ user") and D2 ("the $2^{nd}$ user") respectively, where "D" stands for destination. Note that this transmission strategy can be considered as employing 2-layer transmission with one layer allocated for the common codeword and the other for the private codeword transmission. The 1-layer transmission with one layer allocated for either the common or private codeword is a special case which has been accounted for. Due to the decoding constraints, $x_{1c}$ and $x_{2c}$ are denoted as common codewords whereas $x_{1p}$ and $x_{2p}$ are denoted as private codewords.

Decoding:
The message splitting is utilized by allowing the common messages to be decoded and cancelled at both users, hence decreasing the effect of overall interference. Each user decodes the common messages transmitted by both transmitters and cancels the corresponding codewords, which results in decreased interference-to-noise ratio ("INR"), hence improved signal to interference ratio ("SINR") and achievable rates. After canceling the common codewords, each user decodes the private codeword transmitted by its transmitter treating the private part of the other transmitter as noise.

Achievable Sum Rate Via Sequential Decoding:
Since the common messages, $x_{1c}$ and $x_{2c}$, are desired to be decoded at both users, the decoding order of each codeword determines the achievable rates of the codewords. Utilizing the MMSE receivers at the users, each decoding order in the following gives different achievable rates.

There are four possible decoding orders for the common signals which lead to different SINR values for each split:

I. At the $1^{st}$ user: $x_{1c} \to x_{2c}$, at the $2^{nd}$ user: $x_{2c} \to x_{1c}$
II. At the $1^{st}$ user: $x_{2c} \to x_{1c}$, at the $2^{nd}$ user: $x_{1c} \to x_{2c}$
III. At the $1^{st}$ user: $x_{1c} \to x_{2c}$, at the $2^{nd}$ user: $x_{1c} \to x_{2c}$
IV. At the $1^{st}$ user: $x_{2c} \to x_{1c}$, at the $2^{nd}$ user: $x_{2c} \to x_{1c}$ For each decoding order, the maximum rates of the common messages $x_{ic}$, i=1, 2 at Dj,j=1, 2, via MMSE decoding are denoted by $R_{ic,o}^{Dj}$, $o \in \{I, II, III, IV\}$, and can be calculated as, $$R_{1c,o}^{D1} = \log|I_{r_1} + \alpha_{1c} P_1 H_{11} S_{1c} H_{11}^H (Z_{1c,o}^{D1})^{-1}|,$$
$$R_{1c,o}^{D2} = \log|I_{r_2} + \alpha_{1c} P_1 H_{21} S_{1c} H_{21}^H (Z_{ic,o}^{D2})^{-1}|$$

$$R_{2c,o}^{D1} = \log|I_{r_1} + \alpha_{2c} P_2 H_{12} S_{2c} H_{12}^H (Z_{2c,o}^{D1})^{-1}|,$$
$$R_{2c,o}^{D2} = \log|I_{r_2} + \alpha_{2c} P_2 H_{22} S_{2c} H_{22}^H (Z_{2c,o}^{D2})^{-1}| \quad (6)$$

where the common transmit covariance matrix is:

$$S_{ic} = W_{ic} W_{ic}^H, i=1,2.$$

and the private transmit covariance matrix is:

$$S_{ip} = W_{ip} W_{ip}^H, i=1,2.$$

Note that $Z_{ic,o}^{Dj}$ denotes the noise and interference covariance matrices when $W_{ic}$ is decoded at the $j^{th}$ user for decoding order o, $o \in \{I, II, III, IV\}$, as given in Table A.

TABLE A

Effective noise and interference matrices at each user for each message split.

| o | I | II | III | IV |
|---|---|---|---|---|
| $Z_{1c,o}^{D1}$ | $Z_1 + \Omega_{12}^c$ | $Z_{2c,I}^{D1}$ | $Z_{1c,I}^{D1}$ | $Z_{1c,II}^{D1}$ |
| $Z_{2c,o}^{D1}$ | $Z_1$ | $Z_1 + \Omega_{11}^c$ | $Z_{2c,I}^{D1}$ | $Z_{2c,II}^{D1}$ |
| $Z_{1c,o}^{D2}$ | $Z_2$ | $Z_2 + \Omega_{22}^c$ | $Z_{1c,I}^{D2}$ | $Z_{1c,II}^{D2}$ |
| $Z_{2c,o}^{D2}$ | $Z_2 + \Omega_{21}^c$ | $Z_{1c,I}^{D2}$ | $Z_{2c,II}^{D2}$ | $Z_{2c,I}^{D2}$ |

Here, $\Omega_{jk}^c = \alpha_{kc} P_k H_{jk} S_{kc} H_{jk}^H$, $\Omega_{jk}^P = (1-\alpha_{kc}) P_k H_{jk} S_{kp} H_{jk}^H$, and $Z_j = \Omega_{j1}^P + \Omega_{j2}^P + \Phi_j$. Note that the common messages are desired to be decoded at both users. Therefore, the achievable rate for each split at each decoding order is given by, $$R_{1c,o} = \min[R_{1c,o}^{D1}, R_{1c,o}^{D2}], R_{2c,o} = \min[R_{2c,o}^{D1}, R_{2c,o}^{D2}] \quad (7)$$

for $o \in \{I, II, III, IV\}$. Overall, the optimal decoding order, o*, which gives the maximum sum rate, can be evaluated as, $$o^* = \underset{o \in \{I,II,III,IV\}}{\text{argmax}} (R_{1c,o} + R_{2c,o}) \quad (8)$$

After decoding and canceling the common codewords, $x_{1c}$ and $x_{2c}$, D1 and D2 decode the private codewords, $x_{1p}$ and $x_{2p}$, respectively. Utilizing MMSE decoding, the achievable rates of the private codewords, $x_{1p}$ at D1 and $x_{2p}$ at D2 are given by:

$$R_{1p} = \log|I_{r_1} + (1-\alpha_{1c}) P_1 H_{11} S_{1p} H_{11}^H (\Phi_1 + (1-\alpha_{2c}) P_2 H_{12} S_{2p} H_{12}^H)^{-1}|$$

$$R_{2p} = \log|I_{r_2} + (1-\alpha_{2c}) P_2 H_{22} S_{2p} H_{22}^H (\Phi_2 + (1-\alpha_{1c}) P_1 H_{21} S_{1p} H_{21}^H)^{-1}| \quad (9)$$

Finally, the total achievable sum rate is given by:

$$R_{sum} = R_{1c,o^*} + R_{2c,o^*} + R_{1p} + R_{2p} \quad (10)$$

Note that the achievable sum rate is determined by precoder design (both for common and private messages) and power allocation ratio between common and private messages.

Multi-Rate Coding with Interference Cancelation with Rank-Limited Transmission

The multi-rate coding with interference cancellation when each BS transmits at most one data stream for each private/common split is a special case of the multi-rate coding with interference cancellation, described above. Besides the rate expressions above, there are alternative rate expressions for each data stream in this special case. For notational convenience, $w_{1c}$, $w_{1p}$, $w_{2c}$, and $w_{2p}$ are denoted as the rank-1 counterparts of $W_{1c}$, $W_{1p}$, $W_{2c}$, and $W_{2p}$, respectively.

For each decoding order, the SINR's of the common messages $x_{ic}$, i=1, 2 at Dj,j=1, 2, via MMSE decoding are denoted by $SINR_{ic,o}^{Dj}$, $o \in \{I, II, III, IV\}$, and can be calculated as:

$$SINR_{ic,o}^{D1} = \alpha_{1c} P_1 w_{1c}^H H_{11}^H (Z_{1c,o}^{D1})^{-1} H_{11} w_{1c},$$
$$SINR_{1c,o}^{D2} = \alpha_{1c} P_1 w_{1c}^H H_{21}^H (Z_{1c,o}^{D2})^{-1} H_{21} w_{1c},$$

$$SINR_{2c,o}^{D1} = \alpha_{2c} P_2 w_{2c}^H H_{12}^H (Z_{2c,o}^{D1})^{-1} H_{12} w_{2c},$$
$$SINR_{2c,o}^{D2} = \alpha_{2c} P_2 w_{2c}^H H_{22}^H (Z_{2c,o}^{D2})^{-1} H_{22} w_{2c}. \quad (11)$$

Therefore, the achievable rate of the each split at each user is also expressed as $$R_{1c,o}^{D1} = \log_2(1 + SINR_{1c,o}^{D1}), R_{1c,o}^{D2} = \log_2(1 + SINR_{ic,o}^{D2}),$$

$$R_{1c,o}^{D1} = \log_2(1 + SINR_{2c,o}^{D1}), R_{2c,o}^{D2} = \log_2(1 + SINR_{2c,o}^{D2}). \quad (12)$$

And the achievable rate for each split at each decoding order is given above.

After decoding and canceling the common codewords, $x_{1c}$ and $x_{2c}$, D1 and D2 decode the private codewords, $x_{1p}$ and $x_{2p}$, respectively. Utilizing MMSE decoding, the achievable rates of the private codewords, $x_{1p}$ and at D1 and $x_{2p}$ at D2 are given by $$SINR_{1p}^{D1} = \alpha_{1p} P_1 w_{1p}^H H_{11}^H (\Omega_{12}^p + \sigma_1^2 I_{r_1})^{-1} H_{11} w_{1p},$$
$$SINR_{2p}^{D2} = \alpha_{2p} P_2 w_{2p}^H H_{22}^H (\Omega_{21}^p + \sigma_2^2 I_{r_2})^{-1} H_{22} w_{2p}.$$

Then, the achievable rates for the private codewords are also given by $$R_{1p} = \log_2(1 + SINR_{1p}^{D1}), R_{2p} = \log_2(1 + SINR_{2p}^{D2}).$$

Figure 1E:
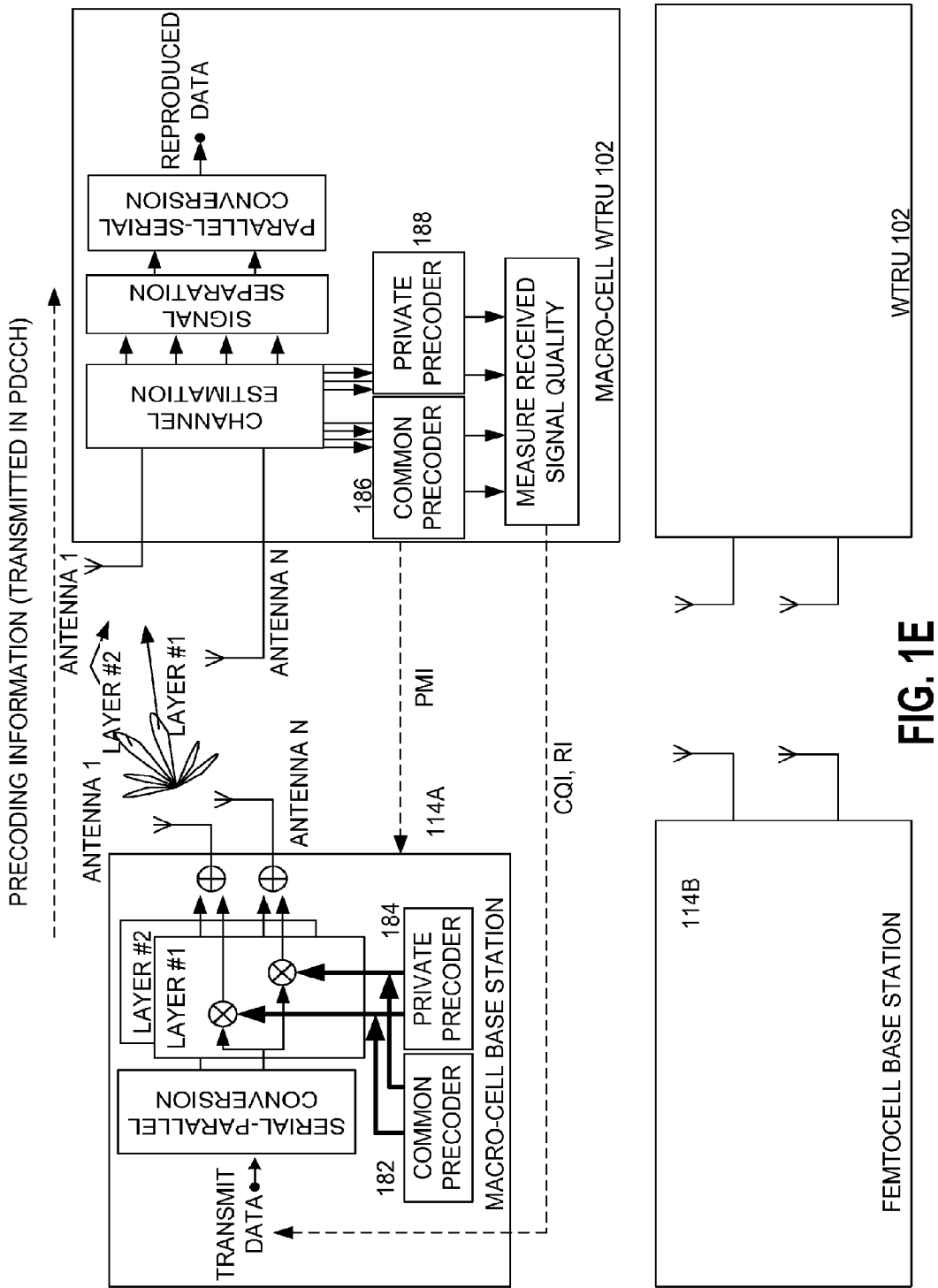
FIG. 1E is a block diagram illustrating an example macro-femto pair and associated macro-cell and femtocell WTRUs of the HetNet system.

Referring now to FIG. 1E, a block diagram illustrating an example macro-femto pair and associated macro-cell and femtocell WTRUs of the HetNet system 150 of the communication system 100 is shown. For convenience, the elements of FIG. 1E are described below with reference to the first macro-femto pair 176 and the macro-cell and femtocell WTRUs 102a, 102d. As shown, the macro-cell base station 114a includes a common precoder ("macro-BS common precoder") 182, and a private precoder ("macro-BS private precoder") 184. The macro-cell WTRU 102a also includes a common precoder ("macro-WTRU common precoder") 186, and a private precoder ("macro-WTRU private precoder") 188. The femtocell base station 114b and the femtocell WTRU 102d are architectures the same as or similar to the macro-cell base station 114a and the WTRU 102a, respectively.

Figure 1F:
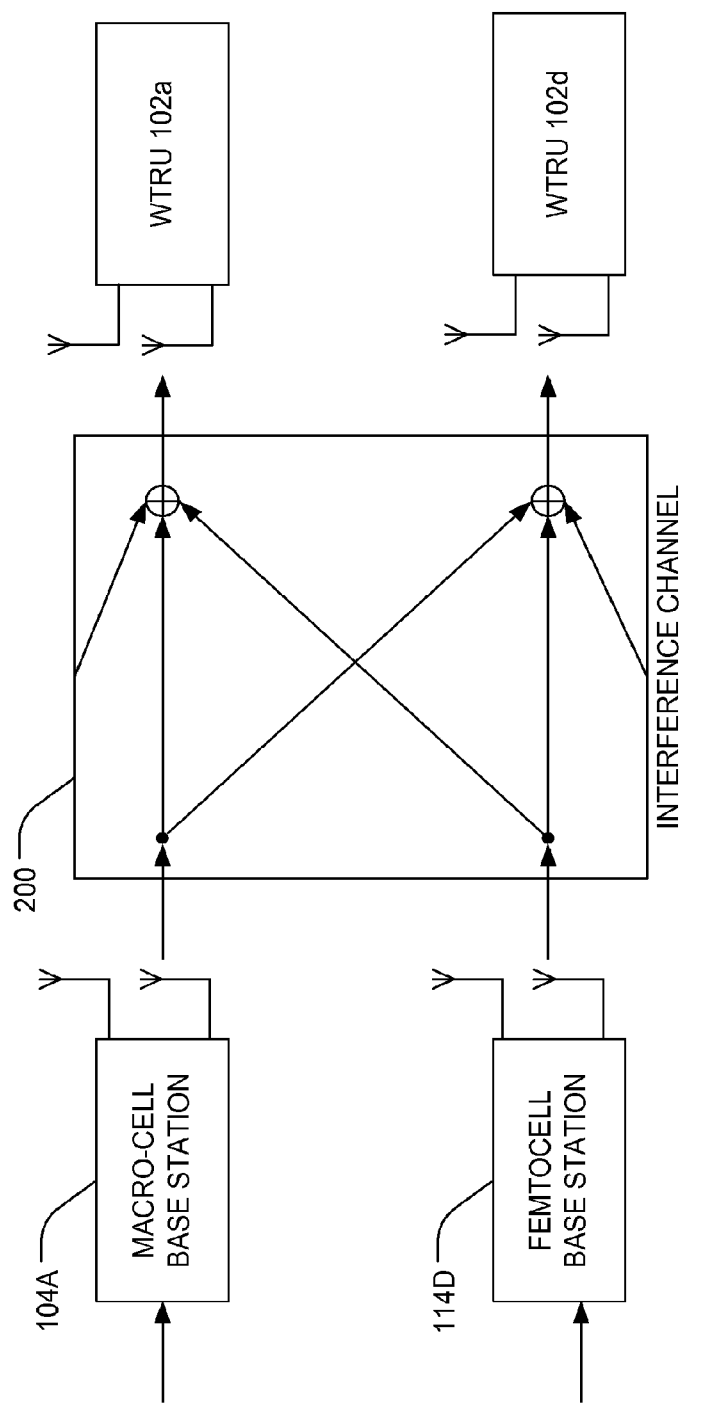
FIG. 1F is a block diagram illustrating an example macro-femto pair and associated macro-cell and femtocell WTRUs of the HetNet system of the communication system.

FIG. 1F is a block diagram illustrating an example macro-femto pair, which may be any of the macro-femto pairs 176-180, along with associated macro-cell and femtocell WTRUs of the HetNet system 150 of the communication system 100. For convenience, the elements of FIG. 1F are described below with reference to the first macro-femto pair 176 and the macro-cell and femtocell WTRUs 102a, 102d. Disposed between the first macro-femto pair 176 and the macro-cell and femtocell WTRUs 102a, 102d is an interference channel 120.

Embodiments are disclosed for mitigation of inter-cell interference ("ICI") in a multi-cell network, such as in the HetNet system 150, ("") carried out at a physical layer of such multi-cell HetNet, in particular, using interference management ("IM") based on message splitting and superposition coding to successively cancel from received signals one or more interfaces receiving ICI. The IM ("") may be viewed as a type of coordinated multi-point ("CoMP") technique, akin to the Coordinated Multi-point ("") technique defined in LTE and LTE-Advanced ("LTE-CoMP"). However, the IM is not limited to LTE and/or LTE advanced. The IM may be used in CoMP transmission (i.e., in multi-cell HetNet downlink) or CoMP reception (i.e., in multi-cell HetNet uplink).

The IM improves performance of the HetNet system 150 (as compared to not using the MS technique), and does so using minimum coordination (e.g., without sharing data) between transmitters/transceivers (collectively "transmitters") of the macro-cell and femtocell base stations 114*a-f* of the HetNet system 150 and/or other multi-cell networks.

Applicability of the Interference Management

Firstly, the IM is applicable whenever inter-cell interference ("ICI") is present in a multi-cell network, such as the HetNet system 150. An ICI is generally observed in multi-cell networks. Herein, a multi-cell network refers to a network which comprises multiple cells, each has at least one transmitter and one receiver, and the transmissions in different cells use overlapped time and frequency resources (i.e., concurrent transmissions with a non-zero frequency reuse factor). Therefore, in a multi-cell network, the receivers are interfered by the transmitters in other cells, which transmit using the same time and frequency resource. Such interference is referred to as the ICI. In multi-cell systems, if no transmissions in different cells use the same time and frequency resource (i.e., the transmissions in different cells are not concurrent, or the frequency reuse factor of the system is zero), the IM might not be applicable.

Secondly, the IM is applicable in both multi-cell homogeneous networks and multi-cell heterogeneous networks. The functionality of the IM may be the same for both multi-cell homogeneous and heterogeneous, but information fed back ("feedback information") from receivers and coordination among the transmitters may be carried out differently for the homogeneous and heterogeneous networks.

Thirdly, the IM is applicable to transmissions in both multi-cell uplink and multi-cell downlink. Most of the examples provided herein, however, are directed to transmissions in multi-cell downlink.

Fourthly, the IM is applicable to transmissions carried out using single-input single-output ("SISO") and/or multiple-input multiple-output ("MIMO"). Most of the examples provided herein, however, are directed to transmissions using MIMO.

Fifthly, the IM is applicable to regimes of different ICI levels. In particular, the IM may be most beneficial in the strong and medium ICI regimes, i.e., when the ICI is (much) stronger than a noise level. The IM may also provide gains in a weak ICI regime, i.e., when the ICI is of slightly above the noise level. In an extremely weak ICI regime (i.e., the ICI is at or below the noise level), the IM might provide gains in the extremely week regime. However, the multi-cell network might fall back to IM based on another technology, such as coordinated beamforming ("CBF"). CBF, however, may be considered as a special case of the superposition-coding-based IM.

Sixthly, the IM, a MIMO technique in nature, may be implemented with space-time coding. The IM is also applicable in time division multiplexing ("TDM") and frequency division multiplexing ("FDM") systems.

Lastly, the IM focuses in the processing in the physical layer. Control and coordination in higher layers may also be required. Additionally and/or alternatively, the IM may be combined with hybrid automatic repeat request ("HARQ").

The IM is beneficial to the practical systems and standards, such as LTE. Firstly, so far in LTE, for users operating at cell edges (")("cell-edge users") of homogeneous networks or HetNets (and, accordingly, subject to receiving strong or medium ICI"), ICI cancellation is considered in the physical layers through CBF, power control, reducing the frequency reuse factor, or time domain silencing, etc., and in the medium access control ("MAC") layer through carrier aggregation. None of these ICI cancellation techniques has shown significant performance improvement. The IM techniques, however, show significant performance improvement for these cell edge users.

Secondly, the current ICI cancellation techniques in LTE rely on the transmitter side ICI cancellation capability, but the potential receiver side ICI cancellation capability is not considered. Recently, the concept of the user side ICI cancellation in downlink has been discussed, but no ICI cancellation scheme has been proposed; no user side ICI cancellation specification has been brought into the LTE standard either. The IM provides a novel receiver side cancellation of ICI, providing significant gains.

As noted above, the IM improves performance (e.g., throughput) of the HetNet system (") 150 and other multi-cell network by mitigating effects of interference at the receivers, and does so with minimal coordination at the transmitters (i.e., without sharing user data between base stations). The current coordinated multi-point ("CoMP") schemes defined in LTE Rel. 8 and 10 cannot achieve the goal. The coordinated scheduling/coordinated beamforming ("CS/CB") scheme has large performance degradation when dealing with strong interference. On the other hand, JT/JP requires data sharing among base stations. To achieve the goal, a new CoMP scheme should be included.

In the new CoMP scheme, in order to provide substantial interference cancellation benefit, the IM may require utilizing an advanced receiver, such as minimum mean square error-successive interference cancellation ("MMSE-SIC") receiver and/or maximum likelihood ("ML") receiver to mitigate the interference. The LTE Rel. 8 and 10, however, do not utilize such advanced receivers at the users in downlink, and do not include the usage and performance evaluation of these advanced receivers at the base stations in uplink. No advanced receivers and no SIC at receivers are assumed by LTE. No information regarding the users' capability of using an advanced receiver and SIC in downlink is fed back to the base stations.

In the CoMP scheme described herein, transmit parameters of the transmitted signal, such as transmission rate, precoding, power allocation, etc., may be determined based on the knowledge of certain channel state information ("CSI"). The transmitters may use certain feedback and feedforward mechanism such that they are known to both the transmitter and the receiver for the purpose of interference cancellation. However, the CSI feedback defined in the current LTE Rel. 8 and 10 is not sufficient for the CoMP scheme described herein, and the transmit parameters are not defined in the feedback/feedforward in the current LTE Rel. 8 and 10.

A network includes an arbitrary number of transmit nodes, receive nodes, transmit antennas, and receive antennas. Some of the transmitter-receiver pairs operate in the same resource blocks (i.e., time and frequency resource, with a frequency reuse factor 1, for example) such that the performance of the corresponding receivers is degraded by the interference. Hence, the transmitters employ a novel transmission scheme to decrease the effect of interference at the destinations. A general description of the novel transmission scheme and examples are provided below. In these examples, it is assumed that there are two antennas at each of the transmitters and two antennas at each of the receiver nodes, and a total of two transmit nodes and two receive nodes. It should be noted that the embodiments may be applicable to any wireless systems with any number of transmit and receive nodes with any number of antennas.

Firstly, to allow receiver side interference cancellation, it is assumed that an advanced receiver (such as maximum likelihood ("ML") receiver and minimum mean square error-successive interference cancellation ("MMSE-SIC") receiver) is used at the receiver side. Depending on the complexity limit at the receiver, the receiver may decode received codewords using sequential and/or joint decoding.

Secondly, each transmitter splits its message (to each of its desired receivers) into at least one layer. The message in each layer may or may not be correlated. Different layers may be encoded and modulated using the modulation and coding schemes ("MCS") of different rates. Different transmission powers and MIMO precoders may be used for different layers. All or part of the layers may be transmitted through the same physical channels.

The message splitting at one transmitter, (i.e., determination of the power allocations, precoders, and MCS, etc.), may or may not be done independently of the message splitting at other transmitters.

The message splitting at one transmitter may be performed based on full or limited channel state information ("CSI"). The CSI may carry short term or long term statistics of the channel to its desired receivers and the channels to its interfering receivers depending on the feedback mechanism. The multi-layer transmission of message splitting is designed so that some or all of the layers may be decoded by interfering receivers in order to minimize the effect of interference observed by that particular transmitter.

Thirdly, each receiver may see the multi-layer interference and the multi-layer desired signal. The receivers are informed with the power allocations, precoders, and MCSs used for all layers of its desired signal and some or all of the layers of the interference.

The receiver may decode some or all of the interference layers depending on the signal strength and data rate and all layers of its desired signal through successive interference cancellation ("SIC").

In case of successive decoding, a decoding order may be chosen such that the overall objective function such as sum throughput, max-min throughput, fairness, etc. is optimized. If the receiver is enabled to perform iterative SIC, it may use iterative SIC to decode as many layers of its desired signal as possible. The SIC of the layers of the interference may or may not be opportunistic such that each receiver opportunistically decodes the interference layers hence minimizes the coordination among the interfering transmitter and receiver pairs.

Lastly, the disclosed scheme may be combined with HARQ. At each transmitter, the layers not decoded at its desired receivers may be retransmitted, and the layers decoded at its desired receivers but not decoded and removed at some of its interfering receivers may or may not be retransmitted.

Example (Downlink Two Transmitter-Receiver Pair Case)

Figure 2:
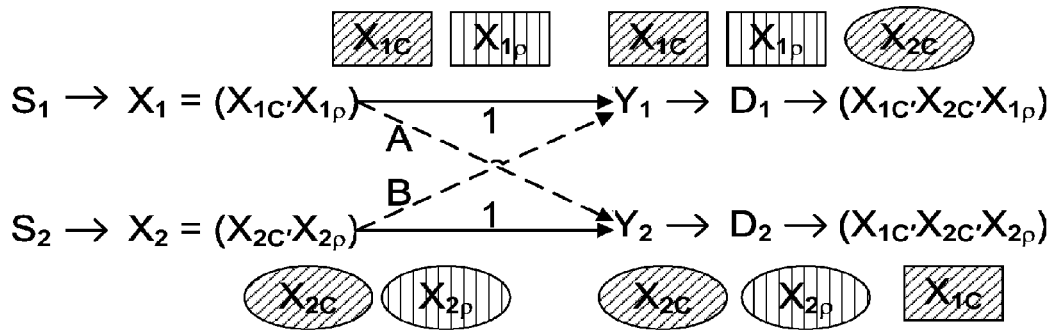
FIG. 2 shows an example of the message splitting in a two transmitter-receiver pair case in accordance with one embodiment.

FIG. 2 shows an example of the message splitting in a two transmitter-receiver pair case in accordance with one embodiment. Each transmitter (e.g., enhanced Node B (eNB)) splits its message into common and private parts such as x1=(x1c, x1p), x2=(x2c, x2p) as shown in FIG. 2. Each part is a separate codeword with its own MCS and cyclic redundancy check ("CRC"), and potentially its own precoding and power levels. The common part is designed to be decodable by one or more other receivers (e.g., WTRUs) besides the intended receiver. After proper precoding, these parts are transmitted together, e.g., using superposition coding and/or spatial multiplexing. Interference cancellation at each receiver is employed by decoding the common part of the interfering transmitter and subtracting the corresponding signal (x1c, x2c) from the overall received signal.

High Level System Operation

Figure 3:
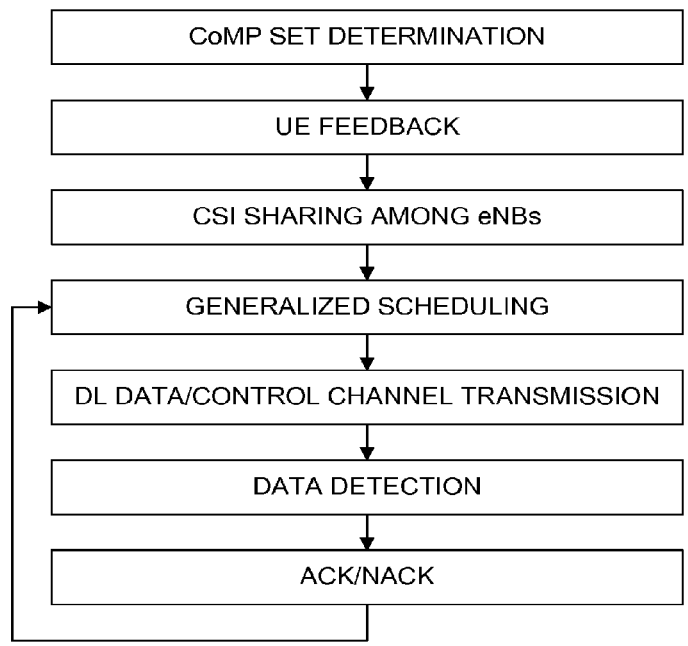
FIG. 3 shows an example system procedure in accordance with one embodiment.

FIG. 3 is a flow chart illustrating an example operation of a system for performing interference mitigation in a HetNet in accordance with one embodiment. The operation starts with determination of a CoMP set, where a group of eNBs form a CoMP set, and coordinate their transmission according to channel condition. The CoMP set may be determined on either a WTRU-specific and network-centric basis.

Each WTRU measures channel state information ("CSI") of the channels from its serving eNB and other eNBs within the CoMP set. Each WTRU processes the CSI and feeds the CSI, as processed, back to its serving eNB. The CSI may be shared among all eNBs within the CoMP set.

Based on the CSI, the network (or more particularly, one or more network scheduling nodes) makes generalized scheduling decisions, including selecting one or more WTRUs to receive data, and transmit parameters, (such as the precoding matrices, power allocations, information whether the WTRU will employ MS, and MCS for both the common and private parts), are determined.

The scheduling process may be implemented in either a centralized or distributed fashion. To facilitate the WTRU data detection, the transmission parameters are also sent to the scheduled WTRUs via downlink control channels (e.g., physical downlink control channels ("PDCCHs")).

Each WTRU first decodes the common parts (both its own and the interfering data), and cancels them from the received signal. Finally, its private data is decoded. CRC checking is applied to each decoded data stream. Accordingly, one or more positive acknowledgement/negative acknowledgement ("ACK/NACK") signal is fed back to the WTRU's serving eNB, which will take ACK/NACK feedback as input in scheduling.

The procedure above may be common to conventional systems. However, due to unique transmission arrangement in MS, special treatment may be applied to certain procedures. The procedures where special treatment is applied are disclosed below.

Identification of WTRU Capability

Since MS transmission requires certain WTRU receiver capability, such as ML or MMSE-SIC, to ensure successful data detection, the WTRU may inform the network of its capability. A new WTRU category may be introduced, and let the network be informed when the WTRU registers to the network. Alternatively, the WTRU may indicate to the network its capability, such as ML or MMSE-SIC capability, in a semi-dynamic fashion, for example, by implicitly indicating to the network via uplink control format. Since a ML/MMSE-SIC capable WTRU may send uplink control message different from what a conventional WTRU sends, the WTRU category may be implicitly identified.

Since the interference (the common part of the interfering signal) detection and cancellation may consume additional power, a WTRU may decide to indicate to the network that it has no such capability to reduce power consumption at the WTRU.

Uplink Feedback Design

Interference management may be implemented using the uplink control channel. When a macro UE is closed to Femto station and connected to macro eNB, its uplink transmission may severely interfere with HeNB reception. To mitigate this problem, uplink control information may be split into two parts that are sent to Femto and Macro eNB separately. Some of the uplink control information, such as HARQ related information, is very time-critical, and excessive latency should be avoided. Similarly, latency can impact UE buffer size. Other information such as CSI is less time critical. The time critical information may be routed directly to its destination (e.g., the macro eNB). The non time-critical information may be routed to the respective Femtocell, and forwarded to Macro eNB via backhaul.

Each WTRU may measure and feedback the CSI between the WTRU and its serving cell. In addition, a WTRU may measure and feedback the CSI between it and all the neighbor cells within the CoMP set. To reduce feedback overhead, CSI may be quantized via direct quantization, or codebook based quantization, or the like. Alternatively, a WTRU may feed back a precoding matrix index ("PMI") to its own serving cell, suggesting the precoding matrix to be used at its serving eNB. In addition, a WTRU may feedback the desired precoding matrices to be used or to be avoided by the neighbor cells within the CoMP set.

In addition to the CSI feedback, each WTRU may feedback a channel quality indicator ("CQI"). In MS, it may be desired to feedback the noise plus non-dominant interference power (total signal power minus signal power from all eNBs in the CoMP set).

There may be another type of information that may be needed for the eNBs to assign MCS properly. A WTRU may estimate the accuracy of its channel estimation regarding the interfering channel.

Generalized scheduling—The scheduling process may be implemented in either a centralized or distributed fashion. In one example of the centralized methods, all eNBs within a CoMP set may jointly make the scheduling decision (including the WTRU selection, and the precoding matrices, power allocations, and MCS assignments for the common and private parts of each WTRU, etc.). In such method, each WTRU measures the channel responses from all eNBs within the CoMP set, including its serving and non-serving eNBs. eNBs may then share their channel information through data forwarding over backhaul. Each eNB may then have full knowledge of the channels of its own WTRUs and the WTRUs within other cells. One eNB may then behave like a central controller, and make scheduling decision for all the cells, and forward the decision to every eNBs within the CoMP set. Such approach may potentially achieve the best performance. It however results in very high complexity.

Alternatively, in one example of the distributed methods, each eNB may make its own scheduling decision (including its own WTRU selection, and the precoder matrices, power allocations, and MCS assignment for the common and private parts of each WTRU, etc.) first. After all eNBs share their scheduling decisions and CSI information, each eNB may determine updates to its scheduling decision on a distributed fashion, assuming a set of rules is established so that each eNB knows the decisions other eNBs are making.

In some scenarios, it may be possible to reduce the decision latency (due to eNB information exchange). For example, in a heterogeneous deployment, where multiple Femto stations are deployed within a macro cell, it may be desired for the macro eNB to broadcast its WTRU selection and transmit format selection ahead of time through a special downlink control channel. To avoid interference from Femto cells, it may also broadcast certain criteria under which a Femto is allowed to transmit.

In the above examples of scheduling, if close loop in scheduling making is assumed, scheduling may be done in a centralized fashion, or done iteratively in a distributed fashion. If open loop in scheduling making is assumed, each eNB in the CoMP set may still inform others of its scheduling decision, and each eNB may make scheduling decision in a cognitive fashion.

Message Splitting Based on PMI Feedback

The MS based on PMI feedback may be done in different ways. In one example approach, the PMI for the desired channel or the "worst match" indicator ("WMI") for the interfering channel, (i.e., the PMI causing most significant interference), may be treated as the quantized CSI (e.g., the transpose conjugate of the matrix represented by the PMI is considered proportional to the quantized channel). The assumption is that the selected PMI is based on the match filter of the channel. At eNB, the channel derived from the PMI is used as it was the true CSI. Transmission format such as the precoding matrices, power allocations, and MCS assignment for the common and private parts, can then be determined. The PMI, rank indicator ("RI"), and CQI feedback may not be sufficient for explicit estimation of the channel though. Additional feedback may be needed. The additional feedback may be of different choices. Two examples of additional feedback are disclosed below.

The channel is estimated based on PMI and RI feedback as follows:

$$H=\beta F^*,$$

where $\beta$ is a positive real scalar to be determined, F is the fed back precoder determined by the PMI and RI, and $(\ )^*$ is the conjugate transpose.

If RI is 1, H is rank deficient. If the PMI's of both rank-1 and rank-2 transmissions are fed back, the channel estimation may be improved. For example, the estimated channel may be a linear combination of the estimated channels based on both the rank-1 and rank-2 transmissions. For the channel estimation based on one fed back PMI and RI, $\beta$ may be estimated based on additional fed back information. In accordance with one embodiment, it may be estimated as follows:

$$\beta = \operatorname*{argmin}_{\beta} \|H - \beta F^*\|^2,$$

which may be calculated at the eNB, quantized, and fed back directly. In this case, the noise plus non-dominant interference power (total signal power minus signal power from all eNBs in the CoMP set) may be quantized and fed back.

In accordance with another embodiment, $\beta$ may not be fed back directly, but an α value and the corresponding delta-CQI may be fed back instead. α is the fraction of interference (the interference contributed from the eNBs in the CoMP set) being removed and delta-CQI is the corresponding CQI if this fraction of interference is removed. The received signal-to-interference and noise ratio ("SINR") and delta-SINR may be estimated based on the CQI and delta-CQI fed back. Substitute H=$\beta F^*$ into the estimated SINR and delta-SINR, as follows:

$$SINR_{ii} = \frac{(F^*(\beta F)(\beta F^*)F)_{ii}}{P_I + N_0}, \text{ and}$$

$$\text{delta-}SINR_{ii} = \frac{(F^*(\beta F)(\beta F^*)F)_{ii}}{(1-\alpha)P_I + N_0},$$

where $P_1$ and $N_0$ denote the interference power and the noise power, respectively. By solving the above equations, both $\beta$ and the interference power may be calculated. The noise plus non-dominant interference power is also estimated as the noise power plus the interference power minus the estimated dominant interference power. The estimated dominant interference power may be based on random beamforming for the eNBs in the CoMP set. If multiple sets of ($\alpha$,delta-CQI) are fed back, the estimation may be improved.

In another example approach, the PMI(s) for the desired channel, the WMI(s) for the interfering channel or "best match" indicator(s) ("BMI(s)") for the interfering channel, i.e., the PMI causing least interference, may be used in a different ways. Firstly, the choice of the precoder for the common part is a tradeoff between using the PMI(s) for the desired channel (to the WTRU in the cell) and using the WMI(s) for the WTRU in the other cell.

Secondly, the choice of the precoder for the private part is a tradeoff between using the PMI(s) for the desired channel (to the WTRU in the cell) and using the BMI(s) for the WTRU in the other cell. The choice of the precoders for the common and private parts for the data at the same eNB may be a tradeoff between maximizing sum rates and reducing the interference of the private part to the common part. Other common rules may also apply. The tradeoffs (the design of the precoders for the common and private parts) are up to the implementations.

In a further embodiment, at each UE, certain CSI are fed back such that the following quantities are obtained at the eNB (and hence, scheduler): 1) In-CoMP-set transmit spatial covariance matrices, i.e., the transmit spatial covariance matrix of the channel from each eNB in the CoMP set to the UE. The transmit spatial covariance matrix of the channel from the ith eNB to the jth UE is defined as $R_{ji} = H_{ji}^H H_{ji}$. 2) Out-of-CoMP-set interference and noise power. The out-of-CoMP-set interference and noise covariance matrix is the sum of the interference covariance matrices of the interference from eNBs out of the CoMP set to the UE, and the noise covariance matrix at the UE. The out-of-CoMP-set interference and noise power is the average power of the out-of-CoMP-set interference and noise, i.e., the average of the diagonal elements of the out-of-CoMP-set interference and noise covariance matrix. Note that the above mentioned quantities are the enablers of the MS technique. They can be obtained through explicit CSI feedback (e.g., feedback of the quantized version of the exact quantities) or implicit CSI feedback (e.g., estimated from feedback such as RI, PMI, CQI, etc).

Precoder Design for Interference Cancellation Using Message Splitting

Examples of the Designs of the Precoders

Practical precoder designs for the multi-rate coding design with interference cancellation are disclosed. Note the following: Firstly, in practical systems, iterative algorithms, such as in the benchmark scheme (above), may not be feasible. Thus low complexity precoder designs are more appealing. Therefore, focus is on closed-form precoder designs.

Secondly, in practical systems, joint decoding might not enabled. Sequential decoding should be considered instead. To lower the design complexity, the common precoder designs that do not depend on the decoding orders are more appealing. Lastly, since the multi-rate coding design in a multi-cell environment is considered, the precoder design should by some means mitigate the interference from the pair of BSs to the users in the other cells in the CoMP set. Note that the femtocell BS has small coverage and its interference to the users located in other macro cells can be ignored. Therefore, the femtocell BS does not necessarily need to minimize its interference to the users except the macro-cell user associated to its paired macro-cell BS. On the other hand, the macro-cell BS should try to minimize its interference to the users in other cells in the CoMP set.

In the following, power optimization designs, private precoder designs and common precoder designs for the multi-rate coding with interference cancellation are disclosed. These designs, if not specified, are for a system with arbitrary number of antennas at each node and without pre-specified number of data steams transmitted from each BS. However in the following, each BS is assumed to have two antennas only in order to demonstrate the designs. Also disclosed is a novel designs for a system in which each BS has two antennas only and each BS transmits at most one data steam for the common (private") split.

Note that a multi-rate coding scheme with interference cancellation can utilize any combination of a power optimization design, private precoder design, and common precoder design developed below.

Power Optimization

The power optimization problem to maximize the sum rate Rsum in (11) or (14) is not a convex optimization problem, and the solution is not trivial. Two ways of search for the power ratios are as follows.

Approach 1: Exhaustive Search for Power Ratios

The optimum power ratio is obtained by exhaustively searching over a set of discrete power ratios, e.g., the set $\{0, 1/n, 2/n, \ldots, 1\}$, where $1/n$ is the step size, to maximize the sum rate Rsum in (11).

Approach 2: Bisection Search for Power Ratios

An important observation in simulations is that the sum rate Rsum as a function of the power ratios $\alpha 1c$ and $\alpha 2c$ is unimodal in most of the channel realizations. When the sum rate is a unimodal function, a bisection search of lower complexity can be used to find the optimum power ratio found by the exhaustive search (i.e., Approach 1). In the channel realizations when the sum rate is not a unimodal function, the solution given by the bisection search may be locally optimal. The bisection search is proposed for a better performance and complexity tradeoff, compared to the exhaustive search (i.e., Approach 1).

Private Precoder Design

Note that the achievable rates for the private splits in (10) are independent from the common precoders, and only depend on the power allocation ratios and the private precoders. The achievable rates for the common splits (7), however, depend on the private precoders.

For sake of simplicity, the private precoder designs are decoupled from the common precoder design. The private precoder designs may be based on fixed power allocation ratios. Maximization of the sum rate of the private splits and minimization of the interference from these two BSs to the selected users in the CoMP set is desired.

Given the fact that the private splits still create mutual interference at the users, beamforming at each transmitter is employed to satisfy two conditions: i) maximize the desired signal power at the user, ii) minimize the interference to the interfered users, including the interfered user associated to the paired BS and the selected users in the other cells in the CoMP set. In order to achieve such objectives, leakage based private precoders are provided. A few designs based on the maximum signal-to-leakage-plus-noise-ratio ("SLNR") criterion are as follows.

Approach 1: Maximum SLNR Precoder Design with Rank Adaptation

For fixed power allocation ratios, a maximum signal-to-leakage-plus-noise-ratio ("SLNR") precoder with rank adaptation is provided. The maximum SLNR precoder design for a given rank is given by:

$$W_{ip}^{SLNR,m_{ip}} = \arg\max_{tr(W_{ip}W_{ip}^H)=1, rank(W_{ip})=m} \frac{tr(W_{ip}^H R_{ii} W_{ip})}{tr(W_{ip}^H[(1-\alpha_{ic})P_i(R_{ji}+L_i)+tr(\Phi_i)I_{t_i}]W_{ip})} \quad (14)$$

where $$W_{ip}^{SLNR,m_{ip}}$$

is a $t_i \times m_{ip}$ normalized precoder, $m_{ip}=1,\ldots,t_i$, $i=1, 2$. Even though the Femto BS may not minimize its interference to the users except for the Macro user, the term Li in is preserved for notational convenience. A closed form solution is then given by:

$$W_{ip}^{SLNR,m_{ip}} \propto T_i \begin{bmatrix} I_{m_{ip}} \\ 0_{(t_i-m_{ip})\times m_{ip}} \end{bmatrix} \quad (15)$$

where Ti is a $t_i \times t_i$ matrix, which satisfies the following:

$$T_i^H R_{ii} T_i = \Lambda_i$$

$$T_i^H[(1-\alpha_{ic})P_i(R_{ji}+L_i)+tr(\Phi_i)I_{t_i}]T_i = I_{t_i} \quad (16)$$

where Λi is a $t_i \times t_i$ diagonal matrix with nonnegative entries. Note that when αic=1, the max SLNR precoder is equivalent to the maximum capacity precoder with specific rank, which is proportional to the matrix whose columns are the mip dominant right eigenvector(s) of the desired channel. With in hand the maximum SLNR precoder of different ranks, the maximum SLNR precoder design with rank adaptation is to find the best ranks $m_{ip}^*$, i=1, 2, to maximize the sum rate of the private splits, i.e.:

$$\{m_{ip}^*\} = \arg\max_{m_{ip},i=1,2} R_{1p}|_{W_{ip}^{SLNR,m_{ip}},i=1,2} + R_{2p}|_{W_{ip}^{SLNR,m_{ip}},i=1,2}. \quad (17)$$

Approach 2: Maximum SLNR Precoder Design with Power and Rank Adaptation

This approach is similar to the maximum SLNR precoder with rank adaptation (i.e., Approach 1). It not only allows rank adaptation but also allows power adaptively allocated to the data streams, if there are multiple data streams. Denote $T_i^{normalized}$ as the $t_i \times t_i$ matrix with normalized columns, and the kth column of $T_i^{normalized}$ is proportional to the corresponding the kth column of Ti, where Ti is the $t_i \times t_i$ matrix satisfying (22), i=1, 2. Also define a power loading matrix for BSi as $Q_i$=diag{, where $q_{i1},\ldots q_{it_i}$}, where $q_{i1},\ldots q_{it_i} \geq 0$ and $q_{i1}+\ldots+q_{it_i}=1$, i=1, 2. The precoder of the private split for BSi is:

$$w_{ip}^{pwr-SLNR} = T_i^{normalized} Q_i^{1/2} \quad (18)$$

where i=1, 2, which allows different powers to be allocated to different data streams through using the power loading matrix. Therefore, the maximum SLNR precoder design with power and rank adaptation is to find the best power loading matrix Qi, i=1, 2, to maximize the sum rate of the private splits, i.e.:

$$\{Q_i^*\} = \arg\max_{Q_i,i=1,2} R_{1p}|_{W_{ip}^{pwr-SLNR},i=1,2} + R_{2p}|_{W_{ip}^{pwr-SLNR},i=1,2}. \quad (19)$$

The optimization is done through exhaustively search over discrete sets of Qi's, i=1, 2. The rank adaptation is done through controlling the values of the diagonal elements of Qi.

Approach 3: Rank-1 Maximum SLNR Precoder Design

In this approach, each transmitter node is assumed to transmits one data stream for the private split. The proposed approach is a special case of both the maximum SLNR precoder with rank adaptation (Approach 1) and the maximum SLNR precoder with power and rank adaptation (Approach 2), when mip=1, i=1, 2. It is suboptimal for the problem (23) and the (25). Note that in this case, the rank-1 maximum SLNR precoder is given by:

$$w_{ip}^{SLNR} = \arg\max_{w_{ip},\|w_{ip}\|=1} \frac{w_{ip}^H R_{ii} w_{ip}}{w_{ip}^H[(1-\alpha_{ic})P_i(R_{ji}+L_i)+tr(\Phi_i)I_2]w_{ip}}, \quad (20)$$

$$i, j = 1, 2, i \neq j$$

A closed from solution is given by:

$$w_{ip}^{SLNR} \propto \max \text{ eigenvector } \{[(1-\alpha_{ic})P_i(R_{ji}+L_i)+tr(\Phi_i)I_2]^{-1}R_{ii}\}, i,j=1,2,i\neq j \quad (21)$$

Note that when αic=1, the max SLNR precoder is equivalent to the maximum capacity precoder, which is the dominant right eigenvector of the desired channel.

Common Precoder Design

Design of the common precoders, W1c and W2c is provided for the sake of simplicity, mitigation of interference to the selected users in other cells in the CoMP set is not considered.

Approach 1: Water-Filling Based Common Precoder Design with Rank Adaptation

From the achievable rate for each split in (7), the achievable rate for each split is the minimum of the achievable rates for each split at the users. A suboptimal design based on the well known maximum capacity precoder design for SU-MIMO systems through water-filling is provided. For fixed private precoders and power allocation ratios, when BSj is silent, the maximum capacity precoder design for the SU-MIMO system from BSi to the kth user is:

$$W_{ic}^{WF,Dk} = \arg\max_{tr(W_{ic}^{Dk}(W_{ic}^{Dk})^H)=1} \log|L_{rk} + \alpha_{ic} P_i H_{ki} W_{ic} W_{ic}^H H_{ki}^H Z_k^{-1}| \quad (22)$$

where Zk is defined in (13), i, j, k=1, 2, i≠j. The closed form solution is given by the water-filling approach. Set $A_i = \{W_{ic}^{WF,D1}, W_{ic}^{WF,D2}\}$ is defined as the candidate precoder set of Wic, i=1, 2. With the candidate precoder sets in hand, the water-filling based common precoder design with rank adaptation is to find the best precoders $W_{ic}^{WF}$, i=1, 2, to maximize the sum rate Rsum in (11), i.e.:

$$\{W_{ic}^{WF}\} = \arg\max_{W_{ic} \in A_i, i=1,2} R_{sum}. \quad (23)$$

Approach 2: Rank-1 Orthogonal Common Precoder Design

In this approach, each transmitter node is assumed to transmit one data stream for the common split. Similar to the SVD-based technique in MIMO transmission, for fixed private precoders, each common precoders is orthogonal to the corresponding private precoder, i.e.:

$$(w_{ic}^\perp)^H w_{ip} = 0$$

Such $w_{ic}^\perp$ is not unique for general number of transmit antennas at the BS. A pair of $w_{ic}^\perp$, i=1, 2, are chosen to maximize the sum rate Rsum in (11). When each transmitter node is equipped with 2 antennas, i.e. ti=2 for all i, the achievable SINR's thus the rates are uniquely determined for fixed power allocation ratios, when orthogonal common precoder is used. The proof is left for interested readers. Without loss of generality, a closed form solution is given by $$w_{ic}^\perp = \begin{bmatrix} 0 & 1 \\ -1 & 0 \end{bmatrix} (w_{ip}^H)^T$$

All common precoders wic, which satisfy (11), satisfy (12) subject to a linear factor (a complex scalar). Note that this common precoder design only depends on the private precoders but not the power allocation ratios. This property further reduces the system design complexity.

Approach 3: Rank-1 Maximum Sum Rate Upper Bound Common Precoder Design

In this approach, each transmitter node is assumed to transmit one data stream for the common split. The proposed approach can be generalized for rank adaptation straightforwardly. Also assumed is that each transmitter node is equipped with 2 antennas, i.e. ti=2 for all i. For fixed private precoders and power allocation ratios, instead of maximizing the sum rate directly, the sum rate upper bound (i.e., the upper bound of the cost function in (19)) is maximized. A problem in the design is:

$$\{w_{1c}^{UB}, w_{2c}^{UB}\} = \arg\max_{w_{1c}, w_{2c}, \|w_{1c}\|=1, \|w_{2c}\|=1} (R_{1c}^m + R_{2c}^m) \tag{24}$$

Note that $R_{1c}^m$ does not depend on w2c, and $R_{2c}^m$ does not depend on w1c. Thus, $R_{1c}^m$ and $R_{2c}^m$ do not depend on the decoding order either. The problem in (30) can be decoupled into two independent sub-problems as $$w_{1c}^{UB} = \arg\max_{w_{ic}, \|w_{ic}\|=1} R_{ic}^m, i = 1, 2 \tag{25}$$

where the rate $R_{ic}^m$ can be expressed as $$R_{ic}^m = \log_2(1 + SINR_{ic}^m),$$

$$SINR_{ic}^m = \min\{SINR_{ic}^{D1}|_{w_{jc}=0}, SINR_{ic}^{D2}|_{w_{jc}=0}\},$$

$i, j = 1, 2, i \neq j$.

Since log 2x is a monotonically increasing function of x, the problem in (31) is equivalent to $$w_{ic}^{UB} = \arg\max_{w_{ic}, \|w_{ic}\|=1} \min\{w_{ic}^H B_{ic}^{Di} w_{ic}, w_{ic}^H B_{ic}^{Dj} w_{ic}\}, \tag{26}$$

$i, j = 1, 2, i \neq j$ where $$B_{ic}^{Di} = \alpha_{ic} P_i H_{ii}^H Z_i^{-1} H_{ii}, B_{ic}^{Dj} = \alpha_{ic} P_i H_{ji}^H Z_j^{-1} H_{ji}. \tag{27}$$

The optimal closed form solution to the problem in (32) is given below.

A generalization of this approach to account for rank adaptation is as follows. Note that for two square matrices X and Y, X≥Y implies |X|≥|Y|. If $B_{ic}^{Dj} \geq B_{ic}^{Dk}$, results in $\log|I_{rj} + \alpha_{ic} P_i H_{ji} W_{ic} W_{ic}^H H_{ji}^H Z_j^{-1}| \geq \log|I_{rk} + \alpha_{ic} P_i H_{ki} W_{ic} W_{ic}^H H_{ki}^H Z_k^{-1}|$ for arbitrary $W_{ic}$, i, j, k=1, 2. Therefore, use $W_{ic}^{WT,DK}$ as the optimal common precoder for BSi. If neither $B_{ic}^{Dj} \geq B_{ic}^{Dk}$ or $B_{ic}^{Dk} \geq B_{ic}^{Dj}$ is satisfied, use the rank-1 common precoder $W_{ic}^{UB}$ as a suboptimal solution for BSi.

A Generalized Karmakar-Varanasi Scheme

Closed-form solutions for the common and private precoders as well as power allocations are disclosed. The precoders (which include the power ratios of the message splits) are as follows;

$$W_{ic}^{kv} = \left[\frac{\sqrt{\lambda_{ij}^{(1)}}}{\sqrt{M_i(1+\lambda_{ij}^{(1)})}} U_{ij}^{(1)}, \ldots, \frac{\sqrt{\lambda_{ij}^{(m_{ij})}}}{\sqrt{M_i(1+\lambda_{ij}^{(m_{ij})})}} U_{ij}^{(m_{ij})}\right], \tag{28}$$

$i = 1, 2, j \neq i$.

$$W_{ip}^{kv} = \left[\frac{1}{\sqrt{M_i(1+\lambda_{ij}^{(1)})}} U_{ij}^{(1)}, \ldots, \frac{1}{\sqrt{M_i(1+\lambda_{ij}^{(m_{ij})})}} U_{ij}^{(m_{ij})}, \frac{1}{\sqrt{M_i}} U_{ij}^{(m_{ij}+1)}, \ldots, \frac{1}{\sqrt{M_i}} U_{ij}^{(M_i)}\right],$$

$i = 1, 2, j \neq i$, where Mi is the number of tx antennas at BSi and mij=min{Mi,Nj} with Nj being the number of antennas at receiver j. $U_{ij}^{(k)}$ is the kth column vector of $U_{ij}$ which is obtained by employing SVD and the interfering links Hji, i.e. from BSi to UEj such that $H_{ji} = V_{ij} \Sigma_{ij} U_{ij}^H$. Also, $\lambda_{ij}^{(k)}$ is the square of the kth singular value obtained from $\Sigma_{ij}$.

For the generalization of the scheme, the following steps are in incorporated:

Step 1—Incorporate the power splits as above such that each message split satisfies the condition, e.g. $\alpha_{ic} + \alpha_{ip} = 1$. The exhaustive search algorithm chooses the variables from the set $\{0, 1/n, 2/n, \ldots, 1\}$, where 1/n is the step size.

Step 2—Normalize the precoders such that:

$$W_{ic,nor}^{kv} = \frac{W_{ic}^{kv}}{\sqrt{tr\{W_{ic}^{kv}\}}}, W_{ip,nor}^{kv} = \frac{W_{ip}^{kv}}{\sqrt{tr\{W_{ip}^{kv}\}}} \tag{29}$$

Step 3—Define other set of precoders such that:

$$W_{1,set2} = \{0, W_{1p}^{WF}\}, W_{2,set2} = \{W_{2c,nor}^{kv}, W_{2p,nor}^{kv}\},$$

$$W_{1,set3} = \{W_{1c,nor}^{WF}, W_{1p,nor}^{kv}\}, W_{2,set3} = \{0, W_{2p}^{WF}\} \quad (30)$$

where $$W_{ip}^{WF} = \arg\max_{tr(W_{ip}(W_{ip})^H)=1} \log|I_{rk} + P_i H_{ki} W_{ip} W_{ip}^H H_{ki}^H Z_k^{-1}|.$$

with $$Z_k = \alpha_{ip} P_i H_{ki} S_{ip} H_{ki}^H + \Phi_k.$$

Step 4—Also, define set 4 as:

$$W_{1,set4} = \{0, W_{1p}^{SLNR,m^*ip}\}, W_{2,set4} = \{0, W_{2p}^{SLNR,m^*2}p\} \quad (31)$$

where $W_{1p}^{SLNR,m^*ip}$, i=1,2, are given above.

Step 5—For each message split power, i.e. $\alpha_{ic}$, $\alpha_{ic}$, choose the precoders that maximize the sum-rate, i.e.:

$$\{W_{1c}^*, W_{1p}^*, W_{2c}^*, W_{2p}^*\} = \arg\max_{\substack{W_{i,setk}, i=1,2 \\ k=1,2,3,4}} R_{1c} + R_{1p} + R_{2c} + R_{2p} \quad (32)$$

Step 5—Finally, given the optimal precoders for each power split, choose the power splits that maximize the sum-rate, i.e.:

$$\{\alpha_{1c}^*, \alpha_{1p}^*, \alpha_{2c}^*, \alpha_{2p}^*\} = \arg\max_{\substack{W_{i,setk}, i=1,2 \\ k=1,2,3,4}} R_{1c} + R_{1p} + R_{2c} + R_{2p} \quad (33)$$

Closed Form Solution

The problem is of the form $$w = \arg\max_{w, \|w\|=1} \min\{w^H D_1 w, w^H D_2 w\},$$

where D1 and D2 are non-negative Hermitian matrices. Apply Eigen Decomposition on D1-D2 to get D1-D2=VΛV$^H$, V=[v1 v2], Λ=diag{λ1, λ2}, λ1≥λ2, where V is unitary. There are three cases as follows.

Case 1: If λ1≥λ2≥0, wHD1w≥wHD2w, and the solution is the dominant eigenvector of D2.

Case 2: If 0≥λ1≥λ2, wHD2w≥wHD1w, and the solution is the dominant eigenvector of D1.

Case 3: If $\lambda_1 \geq 0 \geq \lambda_2$ and $\lambda_1 \neq \lambda_2$, without loss of generality, let W=cos $\theta e^{j\phi} v_1$+sin $\theta v_2$, $\theta \in [0,\pi/2]$, $\phi \in [0,2\pi)$. There are two parameter regimes leading to different solutions.

Parameter regime 1:

If $w^H(D1-D2)w$=cos$^2$ $\theta\lambda_1$+sin$^2$ $\theta\lambda_2 \geq 0$, i.e., $0 \leq \theta \leq \theta_1$, where $\theta_1$=arccos $\sqrt{(-\lambda_2/(\lambda_2-\lambda_2))}$, the cost function becomes wHD2w. Apply Eigen Decomposition on D2 to get D2=V2Λ2V2H, where V2 is unitary and Λ2=diag {λ21, λ22}, λ21≥λ22 ≥0. Use V2 to represent w such that w=V$_2$ [$\beta_1^T \beta_2^T$]$^T$, where β1 and β2 are complex, |β$_1$|$^2$+|β$_2$|$^2$=1. Let K=V$_2^{-1}$V=[k$_{ij}$], and [$\beta_1^T \beta_2^T$]$^T$=K[cos $\theta e^{-j\phi}$sin $\theta$]$^H$. Substitute w=V$_2$[$\beta_1^T \beta_2^T$]$^T$ into the problem to get:

$$\{\theta, \phi\} = \arg\max_{0 \leq \theta \leq \theta_1} |k_{11}|^2 \cos^2\theta + |k_{12}|^2 \sin^2\theta + 2\cos\theta\sin\theta \text{Re}\{k_{11}^H k_{12} e^{-j\phi}\}.$$

In one special case when k11=0, θopt=π/2 and the optimum precoder becomes w=v2. In another special case when k12=0, θopt=0 and without loss of generality, set φ=0, the optimum precoder becomes w=v1. In the general case when both k11≠0 and k12≠0, $\phi_{opt}$=angle($k_{11}^H k_{12}$). Substitute $\phi_{opt}$ into the above problem and after some math manipulations, it becomes $$\theta = \arg\max_{0 \leq \theta \leq \theta_1} (|k_{11}|^2 + |k_{12}|^2)\sin^2(\theta + \varphi_2),$$

where sin $\phi_2 = |k_{11}|/\sqrt{|k_{11}|^2 + |k_{12}|^2}$, cos $\phi_2 = |k_{12}|/\sqrt{|k_{11}|^2 + |k_{12}|^2}$, and $\phi_2 \in [0, \pi/2]$. If $\theta_1 + \phi_2 \leq \pi/2$, θopt=θ1. The optimum precoder and the corresponding max min SINR are $$w = \sqrt{\frac{-\lambda_2}{\lambda_1 - \lambda_2}} \frac{k_{11}^H k_{12}}{|k_{11}^H k_{12}|} v_1 + \sqrt{\frac{\lambda_1}{\lambda_1 - \lambda_2}} v_2,$$

$$SINR_{maxmin} = (\lambda_{21} - \lambda_{22})\left(|k_{11}|\sqrt{\frac{-\lambda_2}{\lambda_1 - \lambda_2}} + |k_{12}|\sqrt{\frac{\lambda_1}{\lambda_1 - \lambda_2}}\right)^2 + \lambda_{22}.$$

Note that in this case, wHD1w=wHD2w. If $\theta_1 + \phi_2 > \pi/2$, $\theta_{opt} = \pi/2 - \phi_2$. The optimum precoder and the corresponding max min SINR are $$w = \frac{k_{11}^H k_{12}}{|k_{12}|\sqrt{|k_{11}|^2 + |k_{12}|^2}} v_1 + \frac{|k_{12}|}{\sqrt{|k_{11}|^2 + |k_{12}|^2}} v_2,$$

$$SINR_{maxmin} = (\lambda_{21} - \lambda_{22})(|k_{11}|^2 + |k_{12}|^2) + \lambda_{22}.$$

Parameter regime 2:

If $w^H(D_1-D_2)w$=cos$^2$ $\theta\lambda_1$+sin$^2$ $\theta\lambda_2 < 0$, i.e., $\theta_1 \leq \theta \leq \pi/2$, the cost function becomes wHD1w. Apply Eigen Decomposition on D1 to get D1=V1Λ1V1H, where V1 is unitary and Λ1=diag{λ11, λ12}, λ11≥λ12≥0. Use V1 to represent w such that w=V$_1$ [χ$_1^T$ χ$_2^T$]$^T$, where χ1 and χ2 are complex, |χ$_1$|$^2$+|χ$_2$|$^2$=1. Let G=V$_1^{-1}$V=[g$_{ij}$], and [χ$_1^T$ χ$_2^T$]$^T$=G[cos $\theta e^{-j\phi}$ sin $\theta$]$^H$. Substitute w=V$_1$[χ$_1^T$ χ$_2^T$]$^T$ into the problem to obtain $$\{\theta, \phi\} = \arg\max_{\theta_1 \leq \theta \leq \pi/2} |g_{11}|^2 \cos^2\theta + |g_{12}|^2 \sin^2\theta + 2\cos\theta\sin\theta \text{Re}\{g_{11}^H g_{12} e^{-j\phi}\}.$$

Similarly, in one special case when g11=0, θopt=π/2 and the optimum precoder becomes w=v2. In another special case when g12=0, θopt=0 and φ=0, the optimum precoder becomes w=v1. In the general case when both g11≠0 and g12≠0, $\phi_{opt}$=angle ($g_{11}^H g_{12}$). Substitute $\phi_{opt}$ into the above problem and after some math manipulations, it becomes:

$$\theta = \arg\max_{\theta_1 \leq \theta \leq \pi/2} (|g_{11}|^2 + |g_{12}|^2)\sin^2(\theta + \varphi_1)$$

where sin $\phi_1 = |g_{11}|/\sqrt{|g_{11}|^2 + |g_{12}|^2}$, cos $\phi_1 = |g_{12}|/\sqrt{|g_{11}|^2 + |g_{12}|^2}$, and $\phi_1 \in [0, \pi/2]$. If $\theta_1 + \phi_1 \leq \pi/2$, $\theta_{opt} = \pi/2 - \phi_1$. The optimum precoder and the corresponding max min SINR are:

$$w = \frac{k_{11}^H k_{12}}{|k_{12}|\sqrt{|k_{11}|^2 + |k_{12}|^2}} v_1 + \frac{|k_{12}|}{\sqrt{|k_{11}|^2 + |k_{12}|^2}} v_2,$$

$$SINR_{maxmin} = (\lambda_{21} - \lambda_{22})(|k_{11}|^2 + |k_{12}|^2) + \lambda_{22}. \qquad (5)$$

If $\theta_1 + \phi_1 \geq \pi/2$, $\theta_{opt} \to \theta_1$, and this result can be considered merged to parameter regime 1.

Therefore, in Case 3, find the SINRmaxmin's in parameter regimes 1 and 2, respectively, and choose the optimum precoder corresponding to the large SINRmaxmin.

In practical systems, limited CSI is available through CSI feedback. Thus, in this embodiment, interference cancellation is performed with limited CSI feedback. In downlink multi-cell HetNets, the CSI is fed back for each sub-band or each resource block (RB), depending on the system. For simplicity, the CSI single carrier is used as an example, and the subcarrier index l is dropped. At each UE, the channel from each eNB is estimated, and the effective channel from each eNB, which is the combination of the channel and the precoder, can also be estimated. At each UE, the following CSI is calculated and fed back to its serving eNB via a perfect channel. The feedback may be subject to certain delay.

In-CoMP-set transmit spatial covariance matrix, which is the transmit spatial covariance matrix of the channel from each eNB in the CoMP set to the UE. The transmit spatial covariance matrix of from the $i^{th}$ eNB to the $j^{th}$ UE $R_{ji} = H_{ji}^H H_{ji}$.

Out-of-CoMP-set interference and noise power, which is the out-of-CoMP-set interference plus noise power is the average power of the out-of-CoMP-set interference plus noise, i.e., $$\sigma_{out-set,j}^2 = tr(\Phi_{out-set,j})/r_j \qquad (34)$$

where $\Phi_{out-set,j}$ is defined as $$\Phi_{out-set,j} = \sum_{k \in \bar{S}} P_k^l H_{jk}^l W_k^l (H_{jk}^l W_k^l)^H + \sigma^2 I_{rj}, \; j \in U_i. \qquad (35)$$

In practical systems, the in-CoMP-set transmit spatial covariance matrix and out-of-CoMP-set interference and noise power may or may not be fed back as they are. They may be fed back through explicit CSI feedback or may be obtained from implicit CSI feedback. A few sophisticated feedback schemes are known in literature.

With the above mentioned CSI feedback, the following quantities are obtained:

The in-set leakage covariance matrix of the $i^{th}$ eNB $L_i$, as described above, is obtained by $$L_i^l = \sum_{i_3 \in S \setminus \{i_1, i_2\}} \sum_{j \in V_{i_3}} R_{ji}^l, \; i \in \{i_1, i_2\}$$

Here, $V_k$ is the set of the selected UEs indices at the $k^{th}$ eNB. Thus, $V_k \subseteq U_k$ where $U_i$ is the set of the UE indices for the UEs associated to the eNB$_i$.

The out-of-pair interference and noise covariance matrix is approximated as proportional to identity matrices, i.e., $$N_j \triangleq \sigma_j^2 I_{rj} = \left[ \frac{\sum_{i \in S \setminus (i_1, i_2)} tr(P_i W_i^H R_{ji} W_i)}{r_j} + \sigma_{out-set,j}^2 \right] I_{rj}, \; j \in U_{i_1} \cup U_{i_2}$$

$$N_j \triangleq \sigma_j^2 I_{rj} = \left[ \frac{\sum_{i \in S \setminus (i_1, i_3)} tr(P_i W_i^H R_{ji} W_i)}{r_j} + \sigma_{out-set,j}^2 \right] I_{rj}, \; j \in U_{i_3}$$

where $W_i$ is the tentative precoder at the ith eNB.

The interference cancellation algorithm is then extended to be based on knowledge of the above mentioned CSI feedback. Since the channel matrices are not known, there is no way to perform interference rejection for the interference transmitted from other eNBs than a UE's serving eNB. The extension of the interference cancellation algorithm is based on approximating some of the interference covariance matrices as proportional to identity matrices.

MS Design with Limited CSI Feedback—In MS, the interference and noise covariance matrices to the common parts are therefore approximated as $$Z_1 \approx (1-\alpha_1) P_1 H_{11} S_{1p} H_{11}^H + (1-\alpha_2) P_2 H_{12} S_{2p} H_{12}^H + N_1 = \Omega_{11}^p + \Omega_{12}^p + \sigma_1^2 I_{r_1},$$

$$Z_2 \approx (1-\alpha_1) P_1 H_{21} S_{1p} H_{21}^H + (1-\alpha_2) P_2 H_{22} S_{2p} H_{22}^H + N_2 = \Omega_{21}^p + \Omega_{22}^p + \sigma_2^2 I_{r_2}. \qquad (36)$$

The cross interference covariances are:

$$\sigma_{12p}^2 = tr(\Omega_{12}^p)/r_1, \sigma_{21p}^2 = tr(\Omega_{21}^p)/r_2, \sigma_{21c}^2 = tr(\Omega_{21}^c)/r_1 \sigma_{21c}^2 = tr(\Omega_{21}^c)/r_2. \qquad (37)$$

The private sum rate can be approximated as $$r_{p,sum} \approx \log |I_{r_1} + (1-\alpha_1) P_1 H_{11} S_{1p} H_{11}^H (N_1 + \sigma_{12p}^2 I_{r_1})^{-1}| + \qquad (38)$$
$$\log |I_{r_2} + (1-\alpha_2) P_2 H_{22} S_{2p} H_{22}^H (N_2 + \sigma_{21p}^2 I_{r_2})^{-1}| =$$
$$\log |I_{t_1} + (1-\alpha_1) P_1 (\sigma_1^2 + \sigma_{12p}^2)^{-1} R_{11} S_{1p}| +$$
$$\log |I_{t_2} + (1-\alpha_2) P_2 (\sigma_2^2 + \sigma_{21p}^2)^{-1} R_{22} S_{2p}|$$

Using sequential decoding, the interference and noise covariance matrices of different decoding orders, defined in Table A, can be approximated as $$Z_{1c,o}^{D1} \approx \Omega_{11}^p + \sigma_{1c,D1,o}^2 I_{r_1}, \; Z_{2c,o}^{D1} \approx \Omega_{12}^p + \sigma_{2c,D1,o}^2 I_{r_1}$$

$$Z_{1c,o}^{D2} \approx \Omega_{21}^p + \sigma_{1c,D2,o}^2 I_{r_2}, \; Z_{2c,o}^{D2} \approx \Omega_{22}^p + \sigma_{2c,D2,o}^2 I_{r_2} \qquad (39)$$

where

TABLE B

| Interference covariance in MS with limited CSI feedback | | | | |
|---|---|---|---|---|
| o | I | II | III | IV |
| $\sigma_{1c,D1,o}^2$ | $\sigma_{12p}^2 + \sigma_{12c}^2$ | $\sigma_{12p}^2 + \sigma_1^2$ | $\sigma_{1c,D1,I}^2$ | $\sigma_{1c,D1,II}^2$ |
| $\sigma_{2c,D1,o}^2$ | $\sigma_{11p}^2 + \sigma_1^2$ | $\sigma_{11p}^2 + \sigma_{11c}^2$ | $\sigma_{2c,D1,I}^2$ | $\sigma_{2c,D1,II}^2$ |
| $\sigma_{1c,D2,o}^2$ | $\sigma_{22p}^2 + \sigma_2^2$ | $\sigma_{22p}^2 + \sigma_{22c}^2$ | $\sigma_{1c,D2,I}^2$ | $\sigma_{1c,D2,II}^2$ |
| $\sigma_{2c,D2,o}^2$ | $\sigma_{21p}^2 + \sigma_{21c}^2$ | $\sigma_{21p}^2 + \sigma_2^2$ | $\sigma_{2c,D2,II}^2$ | $\sigma_{2c,D2,I}^2$ |

Since $A(BAH+I)^{-1} = (AB+I)^{-1} A$, the common rates can be approximated as $$R_{1c,o}^{D1} \approx \tag{40}$$

$$\log\left|I_{r_2} + \alpha_1 P_1 H_{11} S_{1c} H_{11}^H ((1-\alpha_1) P_1 H_{11} S_{1p} H_{11}^H + \sigma_{1c,D1,o}^2 I_{r_2})^{-1}\right| =$$

$$\log\left|I_{t_1} + \alpha_1 P_1 R_{11} S_{1c} ((1-\alpha_1) P_1 R_{11} S_{1p} + \sigma_{1c,D1,o}^2 I_{t_1})^{-1}\right|.$$

In this manner, the common rate is determined based on limited feedback using the covariance matrix $R_{11}$.

Similarly, additional common rates are determined based on limited feedback using covariance matrices $R_{21}$, $R_{12}$, and $R_{22}$:

$$R_{1c,o}^{D2} \approx \log\left|I_{t_2} + \alpha_1 P_1 R_{21} S_{1c}((1-\alpha_1) P_1 R_{21} S_{1p} + \sigma_{1c,D2,o}^2 I_{t_2})^{-1}\right|, \tag{41}$$

$$R_{2c,o}^{D1} \approx \log\left|I_{t_1} + \alpha_2 P_2 R_{12} S_{2c}((1-\alpha_2) P_2 R_{12} S_{1p} + \sigma_{2c,D1,o}^2 I_{t_1})^{-1}\right|,$$

$$R_{2c,o}^{D2} \approx \log\left|I_{t_2} + \alpha_2 P_2 R_{22t} S_{2c}((1-\alpha_2) P_2 R_{22} S_{2p} + \sigma_{2c,D2,o}^2 I_{t_2})^{-1}\right|.$$

Private Precoder Design: The SLNR-based precoder designs can be performed directly using the private sum rate expression given herein as equation (7).

Common Precoder Design: The common precoder designs given herein below can all be extended using the given limited CSI feedback. The Water-filling based common precoder design with rank adaptation can also be transmit spatial covariance matrix feedback based when the cross interference covariance matrices in the water-filling are approximated as proportional to identity matrices, i.e., $$\log\left|I_{r_k} + \alpha_{ic} P_i H_{ki} W_{ic} W_{ic}^H H_{ki}^H Z_k^{-1}\right| \approx \tag{42}$$

$$\log\left|I_{r_k} + \alpha_{ic} P_i H_{ki} W_{ic} W_{ic}^H H_{ki}^H (\Omega_{ki}^p + \sigma_{kjp}^2 I_{r_k} + \sigma_k^2 I_{r_k})^{-1}\right| =$$

$$\log\left|I_{t_i} + \alpha_{ic} P_i R_{ki} W_{ic} W_{ic}^H ((1-\alpha_t) P_i R_{ki} S_{tp} + \sigma_{kjp}^2 I_{t_i} + \sigma_k^2 I_{t_i})^{-1}\right|$$

and when the common rate expressions are used.

Figure 5:
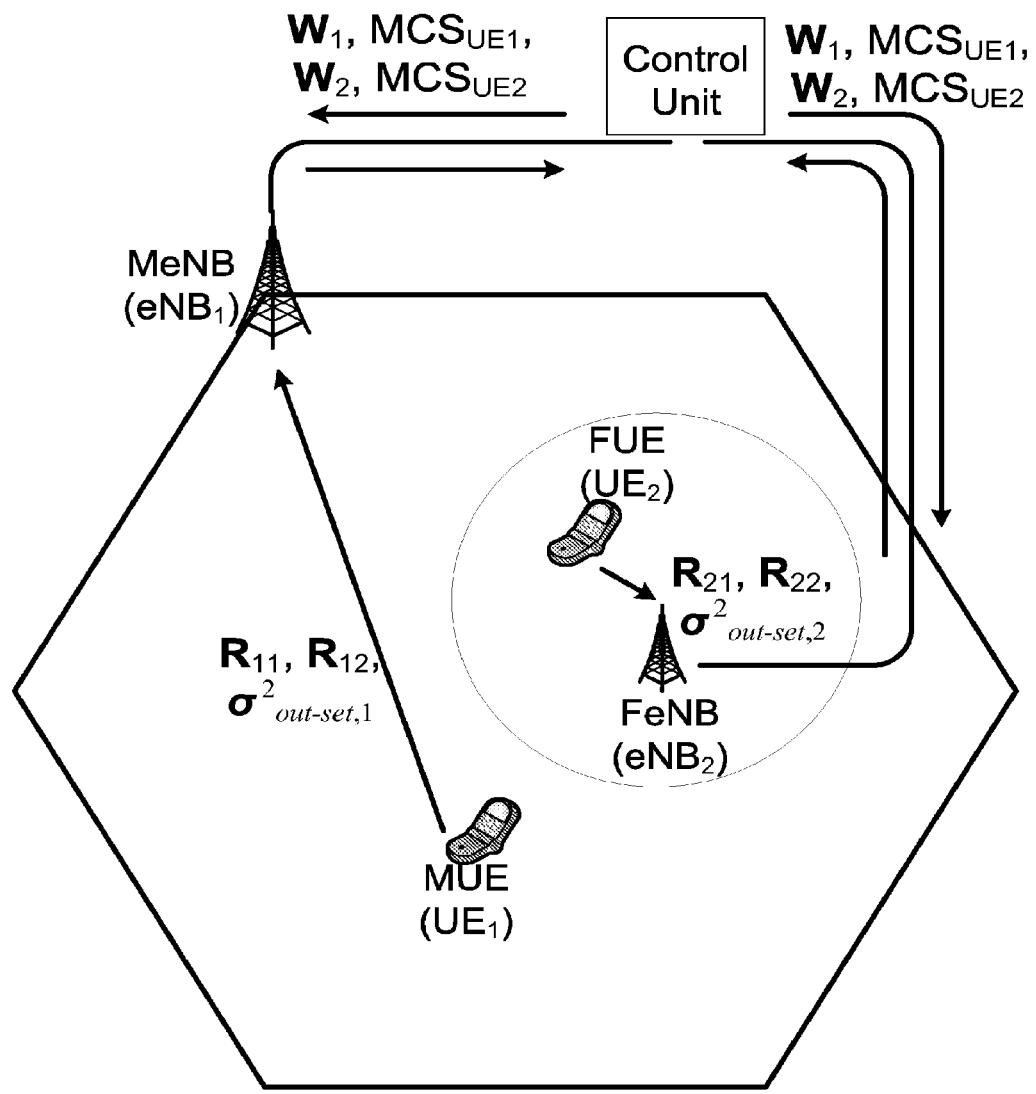

MS signal flow—As shown in FIG. 5, the limited CSI is first fed back from each UE to its own eNB, and then from each eNB to a centralized control unit. The centralized control unit has a scheduler which performs the MS design with given limited CSI feedback. Once the scheduling decision is done, needed information is sent to each eNB for encoding; the information for each UE to decode its signals is also sent to its eNB. There may be multiple ways to do it. One example is as given in FIG. 5, the information of all precoders and MCS's are sent to each eNB, so that the eNB can send it to its UE via downlink control channel. In two-cell simulations, it is observed that regardless of UE locations, numbers of transmit and receive antennas, and cross interference link strength, the proposed MS design with limited CSI feedback performs very close to the MS design with full CSI (i.e., full knowledge of the channel matrices and out-of-CoMP-set interference and noise covariance matrices). The degradation is no more than 2%.

Downlink Control Signal Design

To facilitate decoding of its own data, transmission format parameters may be sent to each scheduled WTRU via a PDCCH. Since additional information is needed compared to the existing LTE system, such as Rel. 8 or Rel. 10, new downlink control information ("DCI") format is provided. Specifically, in one embodiment, the precoding matrices and power allocations for the private and common parts are signaled over the PDCCH. An alternative approach is to convey such information via demodulation reference symbols ("DM-RS").

Since each WTRU may decode part of the interference signal, the related information of interference signal may be passed to the WTRU. The related information may include, but not limited to, MCS, WTRU identity ("ID") (to generate CRC), scheduling information, etc.

One approach to forward the information is for the eNBs within the CoMP set to share the information, and for the serving eNBs to send the information via its PDCCH. Another approach is for each eNB to transmit such information in a public control channel that is hearable by WTRUs in the neighbor cells.

Alternatively, each WTRU may try to decode the PDCCH dedicated from the interfering eNB to the other WTRU in order to obtain the MCSs, power allocations, and precoder matrices of the interfering layer, etc. To enable the decoding, the polynomial info of interfering eNB-WTRU pairs (such as WTRU IDs and CRC) PDCCH may be added to the dedicated PDCCH.

Figure 4:
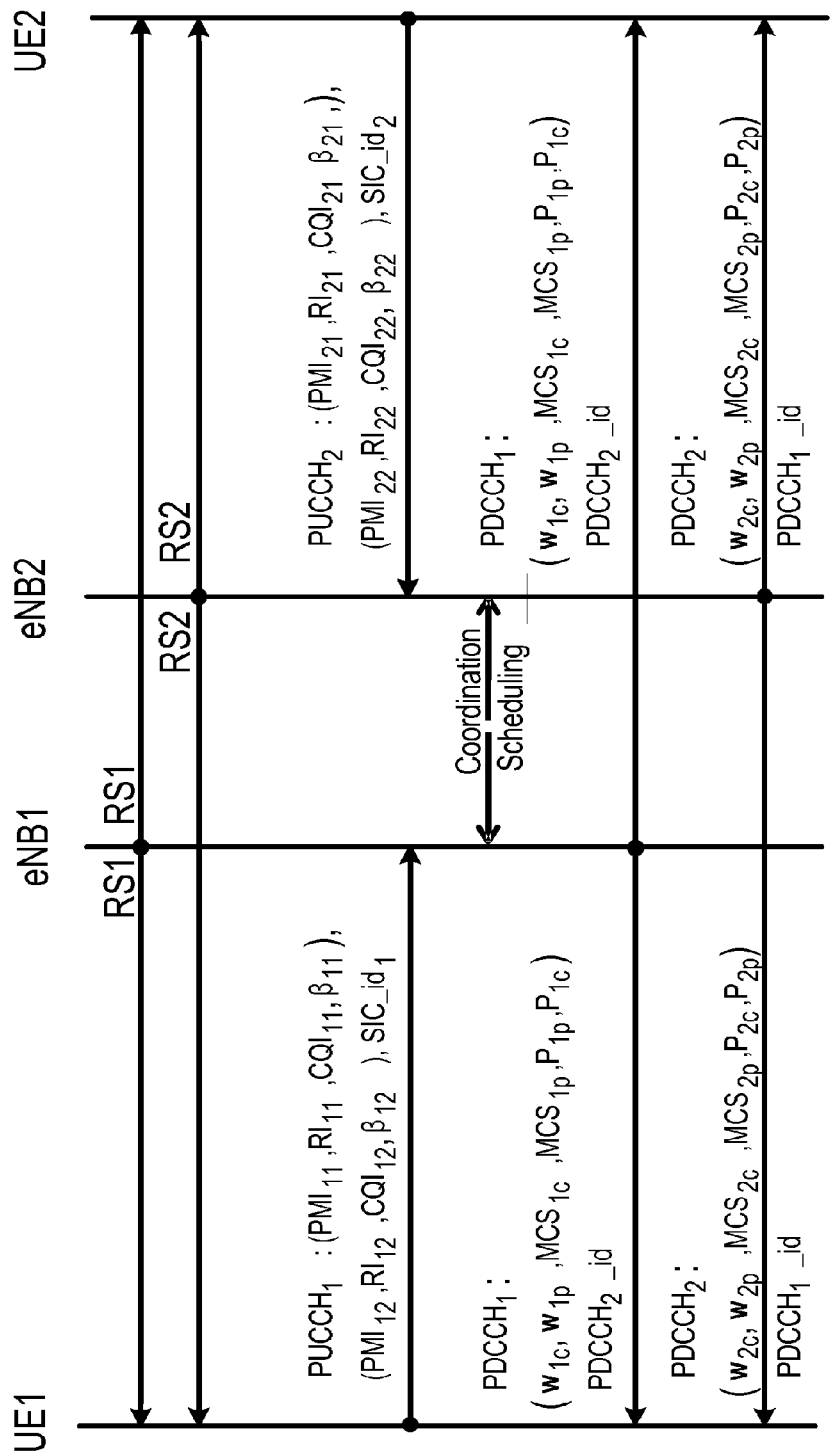
FIG. 4 shows an example of the signal flow in accordance with one embodiment; and, FIG. 5 is a system diagram showing message splitting signal flow of limited CSI feedback.

An example of the signal flow is in FIG. 4. In this example, RS1 and RS2 are the reference signals sent from eNB1 and eNB2, respectively. SIC_idj is the 1-bit indicator showing the j-th WTRU's capability of performing SIC. The subscripts of the PMI, RI, CQI, and β, fed back in the physical uplink control channels ("PUCCHs"), go with the subscripts of the channels.

Another type of information that may be provided is the desired decoding order that may be applied by each WTRU. The detection order may be implicitly determined in the MCS assignment process (at network side), thus it may be beneficial to send such information from the eNB to the WTRU.

HARQ processing—Embodiments to handle reception failure of the common part/private part are disclosed. When using a SIC receiver for the MS method, the detection of the user data may rely on successful interference detection and cancellation. When decoding of interference fails, the UE may require retransmission of interference, which is different than normal HARQ procedures in current LTE systems.

UE feedback procedures—Recall the following decoding orders are used at the UEs for the received codewords:

I. $x_{1c} \to x_{2c} \to x_{ip}$

II. $x_{2c} \to x_{1c} \to x_{ip}$, i=1,2.

It is reasonable to assume that the correct decoding of a particular codeword depends on the correct decoding (and canceling) of the previous codeword scheduled for decoding. Hence, the following cases denote all correct/incorrect outcomes. The values in the shaded cell are obtained from the assumption that the correct decoding of a particular codeword depends on the correct decoding (and canceling) of the previous codeword scheduled for decoding.

For decoding order I

| UE Detection Results | | | ACK/NACK feedback |
|---|---|---|---|
| $NACK_{1c}$ | $NACK_{2c}$ | $NACK_{ip}$ | 00 |
| $ACK_{1c}$ | $NACK_{2c}$ | $NACK_{ip}$ | 01 |
| $ACK_{1c}$ | $ACK_{2c}$ | $NACK_{ip}$ | 10 |
| $ACK_{1c}$ | $ACK_{2c}$ | $ACK_{ip}$ | 11 |

For decoding order II.

| UE Detection Results | | | ACK/NACK feedback |
|---|---|---|---|
| $NACK_{2c}$ | $NACK_{1c}$ | $NACK_{ip}$ | 00 |
| $ACK_{2c}$ | $NACK_{1c}$ | $NACK_{ip}$ | 01 |

-continued

|  UE Detection Results |  |  | ACK/NACK feedback |
| --- | --- | --- | --- |
| $ACK_{2c}$ | $ACK_{1c}$ | $NACK_{ip}$ | 10 |
| $ACK_{2c}$ | $ACK_{1c}$ | $ACK_{ip}$ | 11 |

Since UE data detection relies on successful detection and cancellation of the interference, it may be desirable to feedback the outcome of the interference detection, in addition to the outcome of the data detection. To reduce feedback overhead, described herein is a 2 bit compact feedback to represent each of the four detection outcome as in the tables shown above. Note that the decoding order is assumed having been signaled from eNB to UE.

Upon receiving the ACK/NACK feedback from UEs, eNBs are expected to retransmit the layer where the first NACK occurs. Once the retransmitted layer is received and combined with previous transmission(s), it is likely that it can be decoded correctly and cancelled from receive signals. As a result, the subsequent layer(s) can be decoded correctly without being retransmitted. For example, when "01" is received, layer 2C is expected to be retransmitted if the UE decoding order is I. Once 2C is decoded successfully and cancelled from received signal, 1C and 1P can be decoded correctly. However, since eNB retransmission needs to respond to ACK/NACK feedback from both UEs, the situation may be more complicated as explained in later section.

There are circumstances where UE may request retransmission of an additional layer if it detects that the likelihood of it being successfully decoded is low even after the interference cancellation. One of the mechanisms to enable this is to examine the effective SINR assuming interference has been cancelled, and compare it against a SNR threshold.

An exemplary procedure is described as follows:

UE detects a NACK on the $L^{th}$ layer it is expected to decode.

UE obtains the MCS for the $(L+1)^{th}$ it is expected to decode, and determine a SNR threshold $SNR_{th}$ required to decode the MCS.

UE calculates a SNR assuming interference caused by all the layers up to L has been cancelled and denotes it as $SNR_L$. This can be done after the UE obtains channel estimation of both signal and interference.

If $SNR_L > SNR_{th} +$ delta (all in logarithmic scale), the UE may decide not to request for retransmission of layer (L+1) since there is high probability it can be decoded successfully after layer L is decoded and cancelled. Otherwise, the UE may decide to request for retransmission of layer (L+1). Here delta is a positive number whose optimum value it TBD. The range of delta value could be, for example, between 0 and 1 (dB).

One additional bit may be allocated in the uplink feedback channel to accommodate the UE's request for retransmission of the additional layer. Note the meaning of this additional bit depends on the value of the first two ACK/NACK bits. For example, $b_2=0$ means request of retransmission of layer 2C and layer iP, respectively, for $b_0 b_1 =$ '00' and '01'.

eNB Procedures—Depending on the feedback information received from the UEs, the eNBs make the scheduling decisions for the retransmission and/or new information transmission.

In the following table 1, the eNB procedures for decoding order 1 at both UEs are depicted. The outcome is demonstrated considering the first two feedback bits are $b_0 b_1$. The data packages to be retransmitted are listed in the table. If no retransmission is required for a given layer, a new data package will be transmitted.

TABLE 1 eNB decision table for 2 bit ACK/NACK feedback with decoding order I/I

|  |  | UE 1 feedback |  |  |  |
| --- | --- | --- | --- | --- | --- |
|  |  | 00 (X1c) | 01 (X2c) | 10 (X1p) | 11 |
| UE 2 Feedback | 00 (X1c) | X1c | X1c, X2c | X1c, X1p | X1c |
|  | 01 (X2c) | X1c, X2c | X2c | X2c, X1p | X2c |
|  | 10 (X2p) | X1c, X2p | X2c, X2p | X1p, X2p | X2p |
|  | 11 | X1c | X2c | X1p |  |

From the table, we observe that for the case of UE 2 feedback 11 and UE 1 feedback 01, the UE 1 requests retransmission of X2c whereas UE 2 already decodes the codeword in its first transmission. Hence, the interfering eNB employs the retransmission for the interfered UE even though this is not required for its scheduled UE (interference forwarding).

When the additional feedback bit is sent to eNB, the eNB decision table is shown below. Bit value 'x' indicates a 'don't care'.

TABLE 2 eNB decision table for 3 bit ACK/NACK feedback with decoding order I/I

|  |  | UE 1 feedback |  |  |  |  |  |
| --- | --- | --- | --- | --- | --- | --- | --- |
|  |  | 000 (X1c,X2c) | 001 (X1c) | 010 (X2c,X1p) | 011 (X2c) | 10x (X1p) | 11x |
| UE 2 Feedback | 000 (X1c,X2c) | X1c,X2c | X1c,X2c | X1c,X2c,X1p | X1c,X2c | X1c,X2cX1p | X1c |
|  | 001 (X1c) | X1c,X2c | X1c | X1c,X2c,X1p | X1c,X2c | X1c,X1p | X1c |
|  | 010 (X2c,X2p) | X1c,X2c,X2p | X1c,X2c,X2p | X1c,X2c,X1p | X2c,X2p | X2c,X2p,X1p | X2,X2p |
|  | 011 (X2c) | X1c,X2c | X1c,X2c | X2c,X1p | X2c | X2c,X1p | X2c |
|  | 10x (X2p) | X1c,X2c,X2p | X1c,X2p | X2c,X1p,X2p | X2c,X2p | X2p,X1p | X2p |
|  | 11x | X1c,X2c | X1c | X2c,X1p | X2c | X1p |  |

For the decoding order I at UE 1 and II at UE 2, the following tables show the eNB procedures for 2-bit and 3-bit feedback, respectively.

TABLE 3 eNB decision table for 2 bit ACK/NACK feedback with decoding order I/II

|  |  | UE 1 feedback | | | |
|---|---|---|---|---|---|
|  |  | 00 (X1c) | 01 (X2c) | 10 (X1p) | 11 |
| UE 2 Feedback | 00 (X2c) | X1c, X2c | X2c | X2c, X1p | X2c |
|  | 01 (X1c) | X1c | X1c, X2c | X1c, X1p | X1c |
|  | 10 (X2p) | X1c, X2p | X2c, X2p | X1p, X2p | X2p |
|  | 11 | X1c | X2c | X1p |  |

TABLE 4 eNB decision table for 3 bit ACK/NACK feedback with decoding order I/II

|  |  | UE 1 feedback | | | | | |
|---|---|---|---|---|---|---|---|
|  |  | 000 (X1c,X2c) | 001 (X1c) | 010 (X2c,X1p) | 011 (X2c) | 10x (X1p) | 11x |
| UE 2 Feedback | 000 (X2c,X1c) | X1c,X2c | X1c,X2c | X1c,X2c,X1p | X1c,X2c | X1c,X2cX1p | X1c |
|  | 001 (X2c) | X1c,X2c | X1c,X2c | X1c,X2c,X1p | X2c | X2c,X1p | X2c |
|  | 010 (X1c,X2p) | X1c,X2c,X2p | X1c,X2p | X1c,X2c,X1p,X2p | X1c,X2c,X2p | X1c,X2p,X1p | X1,X2p |
|  | 011 (X1c) | X1c,X2c | X1c | X1c,X2c,X1p | X1c,X2c | X1c,X1p | X1c |
|  | 10x (X2p) | X1c,X2c,X2p | X1c,X2p | X2c,X1p,X2p | X2c,X2p | X2p,X1p | X2p |
|  | 11x | X1c,X2c | X1c | X2c,X1p | X2c | X1p |  |

Similarly, decision tables for the other decoding orders can be obtained using the principles described herein.

The retransmission efficiency may be further improved by incorporating the concept of soft NACK, which indicates how much more information retransmission is needed in case of a failed decoding. In the example above, the WTRU1 may indicate to the network that decoding of x2c is nearly successful, so that retransmission of x2c (by WTRU2) is the best strategy; or WTRU1 may indicate that the initial decoding of x2c is far away from being successful, therefore, it may be more beneficial for WTRU1 to retransmit x1c while WTRU2 transmits x2p (x2c is muted in retransmission).

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory ("ROM"), a random access memory ("RAM"), a register, cache memory, semiconductor memory devices, magnetic media such as internal hard disks and removable disks, magneto-optical media, and optical media such as CD-ROM disks, and digital versatile disks ("DVDs"). A processor in association with software may be used to implement a radio frequency transceiver for use in a WTRU, UE, terminal, base station, RNC, or any host computer.

Moreover, in the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the exemplary embodiments are not limited to the above-mentioned platforms or CPUs and that other platforms and CPUs may support the described methods.

The data bits may also be maintained on a computer readable medium including magnetic disks, optical disks, and any other volatile (e.g., Random Access Memory ("RAM")) or non-volatile ("e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It should be understood that the exemplary embodiments are not limited to the above-mentioned memories and that other platforms and memories may support the described methods.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the terms "any of" followed by a listing of a plurality of items and/or a plurality of categories of items, as used herein, are intended to include "any of," "any combination of," "any multiple of," and/or "any combination of" multiples of the items and/or the categories of items, individually or in conjunction with other items and/ or other categories of items. Further, as used herein, the term "set" is intended to include any number of items, including zero. Further, as used herein, the term "number" is intended to include any number, including zero.

Moreover, the claims should not be read as limited to the described order or elements unless stated to that effect. In addition, use of the term "means" in any claim is intended to invoke 35 U.S.C. §112, ¶ 6, and any claim without the word "means" is not so intended.

In some embodiments, the methods may include: obtaining at a WTRU, demodulation information associated with a private part, a first common part and a second common part; processing a received signal, according to the demodulation information, including at least the first common part, the second common part, and the private part; and, transmitting a multipart HARQ message indicating a combination of acknowledgements and/or non-acknowledgements (ACK/NACK) for the first common part, second common part, and private part.

In additional embodiments, the demodulation information includes Modulation and Coding Scheme (MCS) information; or the MCS information for the first common part is obtained from a Physical Downlink Control Channel (PDCCH) of a first eNodeB and the MCS for the second common part is obtained from a PDCCH of a second eNodeB; or still further, the MCS information is obtained from demodulation reference symbols (DM-RS).

In additional embodiments, the demodulation information includes precoder information and/or power allocations. Still further additional embodiments may further comprise transmitting a Successive Interference Cancellation (SIC) indicator message; or may further comprise processing a signal retransmitted in response to the multipart HARQ message, using successive interference cancellation.

In additional embodiments, a method comprises: obtaining at a first eNodeB a plurality of transmit spatial covariance matrices associated with a respective plurality of WTRUs, including receiving covariance information associated with at least one transmit spatial covariance matrix via an X2 interface from a second eNodeB; determining common and private message splitting rates based on the plurality of covariance matrices; determining common and private precoder weights based on the transmit spatial covariance matrices; and, transmitting a common and a private message parts using the common and private message splitting rates, respectively, and the common and private precoder weights, respectively. In additional embodiments, the covariance information associated with at least one transmit spatial covariance matrix is used to generate an estimate of a corresponding transmit spatial covariance matrix; or the estimate is based on one or more of RI, PMI, and CQI.

Further embodiments include an apparatus comprising: a WTRU including a processor, configured to: obtain demodulation information associated with a private part, a first common part and a second common part; process a received signal, according to the demodulation information, including at least the first common part, the second common part, and the private part; and, control a HARQ process and generate a multipart HARQ message indicating a combination of acknowledgements and/or non-acknowledgements (ACK/NACK) for the first common part, second common part, and private part; and, a transceiver configured to transmit the multipart HARQ message. In some embodiments, the WTRU is configured to obtain the MCS information for the first common part from a Physical Downlink Control Channel (PDCCH) of a first eNodeB and to obtain the MCS for the second common part from a PDCCH of a second eNodeB. The WTRU may also be configured to obtain the MCS information from demodulation reference symbols (DM-RS).

In additional embodiments, the demodulation information includes one of precoder information or power allocations, and/or may be configured to transmit a Successive Interference Cancellation (SIC) indicator message.

Further embodiments may also include a method for maximizing a sum rate of a multiple-in-multiple-out ("MIMO") interference channel in a multi-cell network, the method comprising: performing a bisection search over a set of power ratios to obtain an optimum power ratio allocation between common and private parts of first and second messages; obtaining a private precoder by determining, as a function of the optimum power ratio, a best rank of a maximum signal-to-leakage-plus-noise-ratio precoder with rank adaption to maximize a sum rate of the first and second private parts; obtaining a common precoder by determining, as a function of the private precoder and optimum power ratio, a best rank of a water-filling based common precoder with rank adaption to maximize a sum rate of the MIMO interference channel; and precoding the common parts using the common precoder; precoding the private parts using the private precoder; and transmitting the common and private parts of the first message.

Further embodiments may also include a method for maximizing a sum rate of a multiple-in-multiple-out ("MIMO") interference channel in a multi-cell network, wherein the interference channel comprises first and second transmitter-receiver pairs, the method comprising: performing an exhaustive search over a set of power ratios to obtain an optimum power ratio allocation between common and private parts of first and second messages; obtaining the private precoder by determining, as a function of the optimum power ratio, a best rank of a maximum signal-to-leakage-plus-noise-ratio precoder with rank adaption to maximize the sum rate of the first and second private parts; obtaining the common precoder by determining, as a function of the private precoder and optimum power ratio, a best rank of a water-filling based common precoder with rank adaption to maximize the sum rate of the MIMO interference channel; and precoding the common parts using the common precoder; precoding the private parts using the private precoder; transmitting, from the first transmitter, the common and private parts of the first message; and transmitting, from the second transmitter, the common and private parts of the second message.

Further embodiments may also include a method for maximizing a sum rate of a multiple-in-multiple-out ("MIMO") interference channel in a multi-cell network, wherein the interference channel comprises first and second transmitter-receiver pairs, the method comprising: performing a bisection search over a set of power ratios to obtain an optimum power ratio allocation between common and private parts of first and second messages; obtaining the private precoder by determining, as a function of the optimum power ratio, a best power loading matrix of a maximum signal-to-leakage-plus-noise-ratio precoder with power and rank adaption to maximize the sum rate of the first and second private parts; obtaining the common precoder by determining, as a function of the private precoder and optimum power ratio, a best rank of a water-filling based common precoder with rank adaption to maximize the sum rate of the MIMO interference channel; and precoding the common parts using the common precoder; precoding the private parts using the private precoder; transmitting, from the first transmitter, the common and private parts of the first message; and transmitting, from the second transmitter, the common and private parts of the second message.

Further embodiments may also include a method for maximizing a sum rate of a multiple-in-multiple-out ("MIMO") interference channel in a multi-cell network, wherein the interference channel comprises first and second transmitter-receiver pairs, the method comprising: performing an exhaustive search over a set of power ratios to obtain an optimum power ratio allocation between common and private parts of first and second messages; obtaining the private precoder by determining, as a function of the optimum power ratio, a best power loading matrix of a maximum signal-to-leakage-plus-noise-ratio precoder with power and rank adaption to maximize the sum rate of the first and second private parts; obtaining the common precoder by determining, as a function of the private precoder and optimum power ratio, a best rank of a water-filling based common precoder with rank adaption to maximize the sum rate of the MIMO interference channel; and precoding the common parts using the common precoder; precoding the private parts using the private precoder; transmitting, from the first transmitter, the common and private parts of the first message; and transmitting, from the second transmitter, the common and private parts of the second message.

Further embodiments may also include a method for maximizing a sum rate of a multiple-in-multiple-out ("MIMO") interference channel in a multi-cell network, wherein the interference channel comprises first and second transmitter-receiver pairs, the method comprising: performing a bisection search over a set of power ratios to obtain an optimum power ratio allocation between common and private parts of first and second messages; obtaining the private precoder by determining, as a function of the optimum power ratio, a rank-1 of a maximum signal-to-leakage-plus-noise-ratio precoder with rank-1 adaption to maximize the sum rate of the first and second private parts; obtaining the common precoder by determining, as a function of the private precoder and optimum power ratio, a best rank of a water-filling based common precoder with rank adaption to maximize the sum rate of the MIMO interference channel; and precoding the common parts using the common precoder; precoding the private parts using the private precoder; transmitting, from the first transmitter, the common and private parts of the first message; and transmitting, from the second transmitter, the common and private parts of the second message.

Further embodiments may also include a method for maximizing a sum rate of a multiple-in-multiple-out ("MIMO") interference channel in a multi-cell network, wherein the interference channel comprises first and second transmitter-receiver pairs, the method comprising: performing an exhaustive search over a set of power ratios to obtain an optimum power ratio allocation between common and private parts of first and second messages; obtaining the private precoder by determining, as a function of the optimum power ratio, a rank-1 of a maximum signal-to-leakage-plus-noise-ratio precoder with a rank-1 adaption to maximize the sum rate of the first and second private parts; obtaining the common precoder by determining, as a function of the private precoder and optimum power ratio, a best rank of a water-filling based common precoder with rank adaption to maximize the sum rate of the MIMO interference channel; and precoding the common parts using the common precoder; precoding the private parts using the private precoder; transmitting, from the first transmitter, the common and private parts of the first message; and transmitting, from the second transmitter, the common and private parts of the second message.

Further embodiments may also include a method for maximizing a sum rate of a multiple-in-multiple-out ("MIMO") interference channel in a multi-cell network, wherein the interference channel comprises first and second transmitter-receiver pairs, the method comprising: performing a bisection search over a set of power ratios to obtain an optimum power ratio allocation between common and private parts of first and second messages; obtaining the private precoder by determining, as a function of the optimum power ratio, a best rank of a maximum signal-to-leakage-plus-noise-ratio precoder with rank adaption to maximize the sum rate of the first and second private parts; obtaining the common precoder by determining, as a function of the private precoder and optimum power ratio, a rank-1 orthogonal common precoder to maximize the sum rate of the MIMO interference channel; and precoding the common parts using the common precoder; precoding the private parts using the private precoder; transmitting, from the first transmitter, the common and private parts of the first message; and transmitting, from the second transmitter, the common and private parts of the second message.

Further embodiments may also include a method for maximizing a sum rate of a multiple-in-multiple-out ("MIMO") interference channel in a multi-cell network, wherein the interference channel comprises first and second transmitter-receiver pairs, the method comprising: performing an exhaustive search over a set of power ratios to obtain an optimum power ratio allocation between common and private parts of first and second messages; obtaining the private precoder by determining, as a function of the optimum power ratio, a best rank of a maximum signal-to-leakage-plus-noise-ratio precoder with rank adaption to maximize the sum rate of the first and second private parts; obtaining the common precoder by determining, as a function of the private precoder and optimum power ratio, a rank-1 orthogonal common precoder to maximize the sum rate of the MIMO interference channel; and precoding the common parts using the common precoder; precoding the private parts using the private precoder; transmitting, from the first transmitter, the common and private parts of the first message; and transmitting, from the second transmitter, the common and private parts of the second message.

Further embodiments may also include a method for maximizing a sum rate of a multiple-in-multiple-out ("MIMO") interference channel in a multi-cell network, wherein the interference channel comprises first and second transmitter-receiver pairs, the method comprising: performing a bisection search over a set of power ratios to obtain an optimum power ratio allocation between common and private parts of first and second messages; obtaining the private precoder by determining, as a function of the optimum power ratio, a best power loading matrix of a maximum signal-to-leakage-plus-noise-ratio precoder with power and rank adaption to maximize the sum rate of the first and second private parts; obtaining the common precoder by determining, as a function of the private precoder and optimum power ratio, a rank-1 orthogonal common precoder to maximize the sum rate of the MIMO interference channel; and precoding the common parts using the common precoder; precoding the private parts using the private precoder; transmitting, from the first transmitter, the common and private parts of the first message; and transmitting, from the second transmitter, the common and private parts of the second message.

Further embodiments may also include a method for maximizing a sum rate of a multiple-in-multiple-out ("MIMO") interference channel in a multi-cell network, wherein the interference channel comprises first and second transmitter-receiver pairs, the method comprising: performing an exhaustive search over a set of power ratios to obtain an optimum power ratio allocation between common and private parts of first and second messages; obtaining the private precoder by determining, as a function of the optimum power ratio, a best power loading matrix of a maximum signal-to-leakage-plus-noise-ratio precoder with power and rank adaption to maximize the sum rate of the first and second private parts; obtaining the common precoder by determining, as a function of the private precoder and optimum power ratio a rank-1 orthogonal common precoder to maximize the sum rate of the MIMO interference channel; and precoding the common parts using the common precoder; precoding the private parts using the private precoder; transmitting, from the first transmitter, the common and private parts of the first message; and transmitting, from the second transmitter, the common and private parts of the second message.

Further embodiments may also include a method for maximizing a sum rate of a multiple-in-multiple-out ("MIMO") interference channel in a multi-cell network, wherein the interference channel comprises first and second transmitter-receiver pairs, the method comprising: performing a bisection search over a set of power ratios to obtain an optimum power ratio allocation between common and private parts of first and second messages; obtaining the private precoder by determining, as a function of the optimum power ratio, a rank-1 of a maximum signal-to-leakage-plus-noise-ratio precoder with rank-1 adaption to maximize the sum rate of the first and second private parts; obtaining the common precoder by determining, as a function of the private precoder and optimum power ratio, a rank-1 orthogonal common precoder to maximize the sum rate of the MIMO interference channel; and precoding the common parts using the common precoder; precoding the private parts using the private precoder; transmitting, from the first transmitter, the common and private parts of the first message; and transmitting, from the second transmitter, the common and private parts of the second message.

Further embodiments may also include a method for maximizing a sum rate of a multiple-in-multiple-out ("MIMO") interference channel in a multi-cell network, wherein the interference channel comprises first and second transmitter-receiver pairs, the method comprising: performing an exhaustive search over a set of power ratios to obtain an optimum power ratio allocation between common and private parts of first and second messages; obtaining the private precoder by determining, as a function of the optimum power ratio, a rank-1 of a maximum signal-to-leakage-plus-noise-ratio precoder with a rank-1 adaption to maximize the sum rate of the first and second private parts; obtaining the common precoder by determining, as a function of the private precoder and optimum power ratio, a rank-1 orthogonal common precoder to maximize the sum rate of the MIMO interference channel; and precoding the common parts using the common precoder; precoding the private parts using the private precoder; transmitting, from the first transmitter, the common and private parts of the first message; and transmitting, from the second transmitter, the common and private parts of the second message.

Further embodiments may also include a method for maximizing a sum rate of a multiple-in-multiple-out ("MIMO") interference channel in a multi-cell network, wherein the interference channel comprises first and second transmitter-receiver pairs, the method comprising: performing a bisection search over a set of power ratios to obtain an optimum power ratio allocation between common and private parts of first and second messages; obtaining the private precoder by determining, as a function of the optimum power ratio, a best rank of a maximum signal-to-leakage-plus-noise-ratio precoder with rank adaption to maximize the sum rate of the first and second private parts; obtaining the common precoder by determining, as a function of the private precoder and optimum power ratio, a rank-1 maximum sum rate upper bound common precoder to maximize the sum rate of the MIMO interference channel; and precoding the common parts using the common precoder; precoding the private parts using the private precoder; transmitting, from the first transmitter, the common and private parts of the first message; and transmitting, from the second transmitter, the common and private parts of the second message.

Further embodiments may also include a method for maximizing a sum rate of a multiple-in-multiple-out ("MIMO") interference channel in a multi-cell network, wherein the interference channel comprises first and second transmitter-receiver pairs, the method comprising: performing an exhaustive search over a set of power ratios to obtain an optimum power ratio allocation between common and private parts of first and second messages; obtaining the private precoder by determining, as a function of the optimum power ratio, a best rank of a maximum signal-to-leakage-plus-noise-ratio precoder with rank adaption to maximize the sum rate of the first and second private parts; obtaining the common precoder by determining, as a function of the private precoder and optimum power ratio, a rank-1 maximum sum rate upper bound common precoder to maximize the sum rate of the MIMO interference channel; and precoding the common parts using the common precoder; precoding the private parts using the private precoder; transmitting, from the first transmitter, the common and private parts of the first message; and transmitting, from the second transmitter, the common and private parts of the second message.

Further embodiments may also include a method for maximizing a sum rate of a multiple-in-multiple-out ("MIMO") interference channel in a multi-cell network, wherein the interference channel comprises first and second transmitter-receiver pairs, the method comprising: performing a bisection search over a set of power ratios to obtain an optimum power ratio allocation between common and private parts of first and second messages; obtaining the private precoder by determining, as a function of the optimum power ratio, a best power loading matrix of a maximum signal-to-leakage-plus-noise-ratio precoder with power and rank adaption to maximize the sum rate of the first and second private parts; obtaining the common precoder by determining, as a function of the private precoder and optimum power ratio, a rank-1 maximum sum rate upper bound common precoder to maximize the sum rate of the MIMO interference channel; and precoding the common parts using the common precoder; precoding the private parts using the private precoder; transmitting, from the first transmitter, the common and private parts of the first message; and transmitting, from the second transmitter, the common and private parts of the second message.

Further embodiments may also include a method for maximizing a sum rate of a multiple-in-multiple-out ("MIMO") interference channel in a multi-cell network, wherein the interference channel comprises first and second transmitter-receiver pairs, the method comprising: performing an exhaustive search over a set of power ratios to obtain an optimum power ratio allocation between common and private parts of first and second messages; obtaining the private precoder by determining, as a function of the optimum power ratio, a best power loading matrix of a maximum signal-to-leakage-plus-noise-ratio precoder with power and rank adaption to maximize the sum rate of the first and second private parts; obtaining the common precoder by determining, as a function of the private precoder and optimum power ratio, a rank-1 maximum sum rate upper bound common precoder to maximize the sum rate of the MIMO interference channel; and precoding the common parts using the common precoder; precoding the private parts using the private precoder; transmitting, from the first transmitter, the common and private parts of the first message; and transmitting, from the second transmitter, the common and private parts of the second message.

Further embodiments may also include a method for maximizing a sum rate of a multiple-in-multiple-out ("MIMO") interference channel in a multi-cell network, wherein the interference channel comprises first and second transmitter-receiver pairs, the method comprising: performing a bisection search over a set of power ratios to obtain an optimum power ratio allocation between common and private parts of first and second messages; obtaining the private precoder by determining, as a function of the optimum power ratio, a rank-1 of a maximum signal-to-leakage-plus-noise-ratio precoder with rank-1 adaption to maximize the sum rate of the first and second private parts; obtaining the common precoder by determining, as a function of the private precoder and optimum power ratio, a rank-1 maximum sum rate upper bound common precoder to maximize the sum rate of the MIMO interference channel; and precoding the common parts using the common precoder; precoding the private parts using the private precoder; transmitting, from the first transmitter, the common and private parts of the first message; and transmitting, from the second transmitter, the common and private parts of the second message.

Further embodiments may also include a method for maximizing a sum rate of a multiple-in-multiple-out ("MIMO") interference channel in a multi-cell network, wherein the interference channel comprises first and second transmitter-receiver pairs, the method comprising: performing an exhaustive search over a set of power ratios to obtain an optimum power ratio allocation between common and private parts of first and second messages; obtaining the private precoder by determining, as a function of the optimum power ratio, a rank-1 of a maximum signal-to-leakage-plus-noise-ratio precoder with a rank-1 adaption to maximize the sum rate of the first and second private parts; obtaining the common precoder by determining, as a function of the private precoder and optimum power ratio, a rank-1 maximum sum rate upper bound common precoder to maximize the sum rate of the MIMO interference channel; and precoding the common parts using the common precoder; precoding the private parts using the private precoder; transmitting, from the first transmitter, the common and private parts of the first message; and transmitting, from the second transmitter, the common and private parts of the second message.

What is claimed is:

1. A method comprising:
   obtaining, at a WTRU, demodulation information associated with a private part, a first common part and a second common part, the private part encoded at a rate that the WTRU is capable of decoding and other WTRUs are incapable of decoding, the first common part encoded at a rate that the WTRU and the other WTRUs are capable of decoding, and the second common part encoded at a rate that the WTRUS are capable of decoding;
   processing a received signal, according to the demodulation information, including at least the first common part received from a first base station, the second common part received from a second base station, and the private part received from the first base station; and,
   transmitting a multipart hybrid automatic repeat request (HARQ) message indicating a combination of acknowledgements and/or non-acknowledgements (ACK/NACK) for the first common part, second common part, and private part.

2. The method of claim 1 wherein the demodulation information includes Modulation and Coding Scheme (MCS) information.

3. The method of claim 2 wherein the MCS information for the first common part is obtained from a Physical Downlink Control Channel (PDCCH) of a first eNodeB and the MCS for the second common part is obtained from a PDCCH of a second eNodeB.

4. The method of claim 2 wherein the MCS information is obtained from demodulation reference symbols (DM-RS).

5. The method of claim 1 wherein the demodulation information includes precoder information.

6. The method of claim 1 wherein the demodulation information includes power allocations.

7. The method of claim 1 further comprising transmitting a Successive Interference Cancellation (SIC) indicator message.

8. The method of claim 1 further comprising processing a signal retransmitted in response to the multipart HARQ message, using successive interference cancellation.

9. The method of claim 1 wherein the WTRU is the intended receiver of the private part and the first common part and is not the intended receiver for the second common part.

10. The method of claim 1 wherein the multipart HARQ comprises fewer bits than the number of private and common parts.

11. The method of claim 1 further comprising:
    obtaining at the WTRU a decoding order of the private part, first common part, and second common part.

12. An apparatus comprising:
    a WTRU including a processor, configured to:
       obtain demodulation information associated with a private part, a first common part and a second common part, the private part encoded at a rate that the WTRU is capable of decoding and other WTRUs are incapable of decoding, the first common part encoded at a rate that the WTRU and the other WTRUs are capable of decoding, and the second common part encoded at a rate that the WTRUS are capable of decoding;
       process a received signal, according to the demodulation information, including at least the first common part received from a first base station, the second common part received from a second base station, and the private part received from the first base station; and,
       control a HARQ process and generate a multipart HARQ message indicating a combination of acknowledgements and/or non-acknowledgements (ACK/NACK) for the first common part, second common part, and private part; and,
    a transceiver configured to transmit the multipart HARQ message.

13. The apparatus of claim 12 wherein the WTRU is configured to obtain Modulation and Coding Scheme (MCS) information for the first common part from a Physical Downlink Control Channel (PDCCH) of a first eNodeB, and to obtain MCS information for the second common part from a PDCCH of a second eNodeB.

14. The apparatus of claim 13 wherein the WTRU is configured to obtain the MCS information from demodulation reference symbols (DM-RS).

15. The apparatus of claim 12 wherein the demodulation information includes one of precoder information or power allocations.

16. The apparatus of claim 12 wherein the WTRU is further configured to transmit a Successive Interference Cancellation (SIC) indicator message.

17. The apparatus of claim 12 wherein the WTRU is the intended receiver of the private part and the first common part and is not the intended receiver for the second common part.

18. The apparatus of claim 12 wherein the multipart HARQ comprises fewer bits than the number of private and common parts.

19. The apparatus of claim 12 wherein the processor is further configured to obtain a decoding order of the private part, first common part, and second common part.

\* \* \* \* \*